US012459877B1

(12) United States Patent
Helal

(10) Patent No.: US 12,459,877 B1
(45) Date of Patent: Nov. 4, 2025

(54) RECYCLABLE CATALYST FOR CARBON DIOXIDE CAPTURE

(71) Applicant: KING FAHD UNIVERSITY OF PETROLEUM AND MINERALS, Dhahran (SA)

(72) Inventor: Aasif Helal, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/245,521

(22) Filed: Jun. 23, 2025

(51) Int. Cl.
| | |
|---|---|
| C07C 1/12 | (2006.01) |
| B01D 53/86 | (2006.01) |
| B01J 31/16 | (2006.01) |
| B01J 35/31 | (2024.01) |
| B01J 35/61 | (2024.01) |
| B01J 35/64 | (2024.01) |
| B01J 37/04 | (2006.01) |
| B01J 37/08 | (2006.01) |
| B01J 38/52 | (2006.01) |

(52) U.S. Cl.
CPC ............ C07C 1/12 (2013.01); B01D 53/8671 (2013.01); B01J 31/1691 (2013.01); B01J 35/31 (2024.01); B01J 35/617 (2024.01); B01J 35/618 (2024.01); B01J 35/643 (2024.01); B01J 37/04 (2013.01); B01J 37/08 (2013.01); B01J 38/52 (2013.01); B01D 2255/2042 (2013.01); B01D 2255/9202 (2013.01); B01D 2255/9207 (2013.01); B01D 2257/504 (2013.01); B01J 2231/30 (2013.01); B01J 2531/25 (2013.01)

(58) Field of Classification Search
CPC .. B01J 2257/504; B01J 31/1691; B01J 35/31; B01J 35/617; B01J 35/618; B01J 35/643; B01J 37/04; B01J 37/08; B01J 38/52; B01J 2231/30; B01J 2531/25; B01J 53/8671; B01D 2255/2042; B01D 2255/9202; B01D 2255/9207; C07C 1/12
See application file for complete search history.

(56) References Cited

U.S. PATENT DOCUMENTS

| | | |
|---|---|---|
| 9,718,748 B1 | 8/2017 | Allendorf et al. |
| 2024/0269659 A1 | 8/2024 | Ma et al. |

FOREIGN PATENT DOCUMENTS

| | | | |
|---|---|---|---|
| KR | 100907907 B1 | 7/2009 | |
| WO | 2010130299 A2 | 11/2010 | |
| WO | WO-2021231822 A1 * | 11/2021 | ............ A61P 31/00 |

OTHER PUBLICATIONS

Xiu-Yuan Li, et al., "Honeycomb metal-organic framework with Lewis acidic and basic bifunctional sites: selective adsorption and CO2 catalytic fixation", Mar. 22, 2018. ACS Applied Materials & Interfaces, vol. 10, Issue 13, pp. 10965-10973.

* cited by examiner

Primary Examiner — Brian A Mccaig
(74) Attorney, Agent, or Firm — Oblon, McClelland, Maier & Neustadt, L.L.P.

(57) ABSTRACT

A recyclable catalyst for carbon dioxide capture includes a porous metal-organic crystallite, where the porous metal-organic crystallite includes a porous complex of Ba ions and units of 4,4',4'-s-triazine-2,4,6-tribenzoic acid. Further, the walls of the pores of the porous metal-organic crystallite have a molecular honeycomb pattern formed by the porous complex, and where the pores of the molecular honeycomb pattern have an average pore width of 17 angstrom (Å) to 19 Å and barium clusters active metal sites. A method of fabrication of the recyclable catalyst.

19 Claims, 19 Drawing Sheets

RECYCLABLE CATALYST FOR CARBON DIOXIDE CAPTURE

STATEMENT OF PRIOR DISCLOSURE BY AN INVENTOR

Aspects of the present disclosure are described in Helal, A., Fettouhi, M., Algahtani, S. M., Umar, Y., Khan, S., Sanhoob, M. A. (2025) "Nitrogen-Rich Barium-Organic Framework for Capture and Cocatalysts Free Chemical Fixation of $CO_2$ via Cyclic Carbonates and Oxazolidinones," ACS Appl. Mater. Interfaces, 17(4), 6271-628, which is incorporated herein by reference in its entirety.

STATEMENT OF ACKNOWLEDGEMENT

Support provided by the Interdisciplinary Research Center for Hydrogen Technologies and Carbon Management at King Fahd University of Petroleum and Minerals, Saudi Arabia is gratefully acknowledged.

BACKGROUND

Technical Field

The present disclosure is directed to a catalyst, more particularly towards a recyclable catalyst for carbon dioxide capture.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

The economic approaches to reducing atmospheric carbon dioxide ($CO_2$) emissions are increasingly proving inadequate for enabling fast solutions to the global climate crisis. High carbon dioxide levels in the stratosphere hinder the formation of new ozone molecules, thereby worsening the greenhouse effect and global warming [Schwartzman, A.; Keeling, R. F., 2020, Nature Climate Change, 10, 416-417, and Jiang, J.; Ye, B.; Liu, J., 2019, Applied Energy, 235, 186-203]. Transportation and power generation account for more than 67% of the increase in anthropogenic greenhouse gas (GHG) emissions. One of the most feasible options for $CO_2$ mitigation is the production of valuable products from $CO_2$ through energy-integrated processes [Qiu, L.; Li, H.; He, L., 2023, Accounts of Chemical Research, 56, 2225-2240]. This may substantially aid in the reduction of $CO_2$ storage costs, the recoupment of carbon capture expenses, and the enhancement of the overall economic viability of the process [Roy, P.; Mohanty, A. K.; Misra, M., 2023, Environmental Science: Advances, 2, 409-423]. The application of $CO_2$ in chemical fixation for the synthesis of fine chemicals contributes to a greener and more sustainable chemical industry, rather than simply storing valuable C1-feedstock. The chemical inertness and thermodynamic stability of the cheap and abundant $CO_2$ molecules make it challenging to efficiently fix under ambient temperature and pressure [Trickett, C. A.; et al., 2017, Nature Reviews Materials, 2, 17045, and Salam, N.; et al., 2020, New Journal of Chemistry, 44, 5448-5456].

The production of cyclic carbonates and oxazolidinones from $CO_2$ results in 100% atom-efficient reactions. Five-membered cyclic carbonate and its derivatives are highly desirable synthetic targets due to its numerous practical applications and significant characteristics. They act as potential intermediates in pharmaceutical products, electrolytes in Li-ion batteries, and aprotic, biodegradable, less toxic polar solvents [Jehanno, C.; et al., 2020, ACS Macro Letters, 9, 443-447, Comerford, J. W.; et al., 2015, Green Chemistry, 17, 1966-1987, and Helal, A.; et al., 2023, Catalysis Letters, 153, 2883-2891]. They are also synthetic intermediates for glycerol carbonates and ring-opening polymerization [Muzyka, C.; et al., 2024, ACS Catalysis, 14, 12454-12493, and Brandão, P.; Pineiro, M.; Pinho e Melo, T. M. V. D., 2019, European Journal of Organic Chemistry, 43, 7188-7217]. The synthesis of five-membered cyclic carbonates may be performed through two methods: the cycloaddition of $CO_2$ to epoxides using catalysts (metal complexes) and cocatalysts, which requires harsh reaction conditions and may lead to separation difficulties [Peña-López, M.; Neumann, H.; Beller, M., 2016, European Journal of Organic Chemistry, 22, 3721-3727], or the reaction of a diol with toxic phosgene gas [Mundo, F.; et al., 2024, ACS Sustainable Chemistry & Engineering, 12(17), 6452-6466]. Nevertheless, most of the catalysts necessitate using an additional co-catalyst (tetrabutylammonium bromide) to get substantial yields of the respective products [Bhambri, H.; Mandal, S. K. 2024, ChemCatChem, 16(19), e202400429]. One potential strategy for circumventing the need for an additional nucleophilic cocatalyst is to develop catalysts that possess a substantial abundance of Lewis acidic and basic sites by application of systematically designed organic linkers or post-synthetic modification of the metal-organic framework (MOFs) [Wu, Z.; et al., 2024, Inorganic Chemistry, 63(29), 13450-13458, Helal, A.; et al., 2021, Journal of CO2 Utilization, 50, 101603-101609, and Baronsky, T.; et al., 2013, ACS Catalysis, 3(4), 790-797]. Therefore, to achieve an effective cycloaddition of $CO_2$ without a co-catalyst, the MOF should possess a significant number of Lewis acidic and basic sites and a soaring affinity for capturing $CO_2$.

While metal-organic frameworks (MOFs) offer high surface area and tunable porosity for effective $CO_2$ capture, they also have notable disadvantages. Many MOFs suffer from poor thermal and chemical stability, especially in the presence of moisture, which is common in flue gases. Their synthesis may be costly and complex, making large-scale production challenging. Additionally, some MOFs require high energy input for regeneration, reducing the overall energy efficiency in carbon capture applications.

Each of the catalysts suffers from one or more drawbacks hindering their adoption. Accordingly, one goal of the present disclosure is to develop a catalyst system for carbon dioxide capture, that may overcome the drawbacks, such as, poor thermal and chemical stability, complex structure, high-cost factor, of the materials known in the prior arts.

SUMMARY

In an exemplary embodiment, a recyclable catalyst for carbon dioxide capture is described. The catalyst includes a porous metal-organic crystallite, where the porous metal-organic crystallite includes a porous complex of Ba ions and units of 4,4',4'-s-triazine-2,4,6-tribenzoic acid. Further, the walls of the pores of the porous metal-organic crystallite have a molecular honeycomb pattern formed by the porous complex, and where the pores of the molecular honeycomb pattern have an average pore width of 17 angstrom (Å) to 19 Å and barium clusters active metal sites.

In some embodiments, the recyclable catalyst has a brunauer-emmett-teller (BET) surface area of 1000 square meter per gram ($m^2g^{-1}$) to 1100 $m^2g^{-1}$.

In some embodiments, the recyclable catalyst has a $CO_2$ adsorption rate of 3 millimole per gram ($mmolg^{-1}$) to 6 $mmolg^{-1}$ at a temperature of 0-degree celcius (° C.) to 25° C.

In some embodiments, the recyclable catalyst has a $N_2$ adsorption rate of 0.03 $mmolg^{-1}$ to 0.5 $mmolg^{-1}$ at a temperature of 0° C. to 25° C.

In some embodiments, the recyclable catalyst has a $CO_2$ adsorption heat of 30 kilojoule per mole ($kJmol^{-1}$) to 40 $kJmol^{-1}$.

In another exemplary embodiment, a method of synthesizing the recyclable catalyst is described. The method includes dissolving an ionic barium compound and 4,4',4''-s-triazine-2,4,6-tribenzoic acid in an aqueous solution including an organic solvent. Further, the method includes heating the reaction mixture to at least 100° C., then cooling to obtain an orthorhombic crystal with barium oxide ($BaO_9$) clusters.

In some embodiments, the ionic barium compound is at least one selected from the group including barium nitrate ($Ba(NO_3)_2$), barium chloride ($BaCl_2$), barium sulfate ($BaSO_4$), barium carbonate ($BaCO_3$), barium oxide (BaO), and barium chromate ($BaCrO_4$).

In some embodiments, the triyl-tribenzoic acid is 4,4'4''-s-triazine-2,4,6-triyl-tribenzoic acid ($H_3TATB$).

In yet another exemplary embodiment, a method of cycloaddition of carbon dioxide without a co-catalyst is described. The method includes reacting an epoxide and carbon dioxide in the presence of the catalyst to obtain a reaction mixture. Further, the method includes stirring the reaction mixture at a temperature of 50° C. to 90° C. for 6 h to 10 h to obtain a product phase and a catalyst phase. Still further, the method includes separating the product phase from the catalyst phase, then drying the product phase to obtain a cyclic carbonate.

In some embodiments, the epoxide has at least one substituent including alkyl group, phenyl group, alkyl halides, alkyl oxides.

In some embodiments, the epoxide has the following formula

where R is —$CH_3$, —$CH_2CH_3$, —$CH_2CH_2CH_2CH_3$, -Cy, —$C_6H_5$, —$CH_2Cl$, —$CH_2OCH_2CH=CH_2$, —$CH_2OC_6H_5$.

In some embodiments, the method further includes reacting to the reaction mixture with one or more amines to form a heterocyclic oxazolidinone.

In some embodiments, the catalyst is reused at least 9 times.

In some embodiments, the reaction mixture is solvent free.

In some embodiments, reacting is carried out at a carbon dioxide pressure of at least 1 bar.

In some embodiments, the yield of cyclic carbonate is at least 51 moles % based on the amount of epoxide.

In some embodiments, epoxide is styrene oxide and the reacting forms the cyclic carbonate in a yield of at least 98 mole % based on the amount of the epoxide.

In some embodiments, the method further includes washing the catalyst phase with an organic solvent. Further, the method includes vacuum drying the catalyst at a temperature of 110° C. to 130° C. to obtain recycled catalyst.

In some embodiments, the organic solvent is an alcohol.

In some embodiments, the recycled catalyst converts at least 95 mole % styrene oxide after at least 9 cycles.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
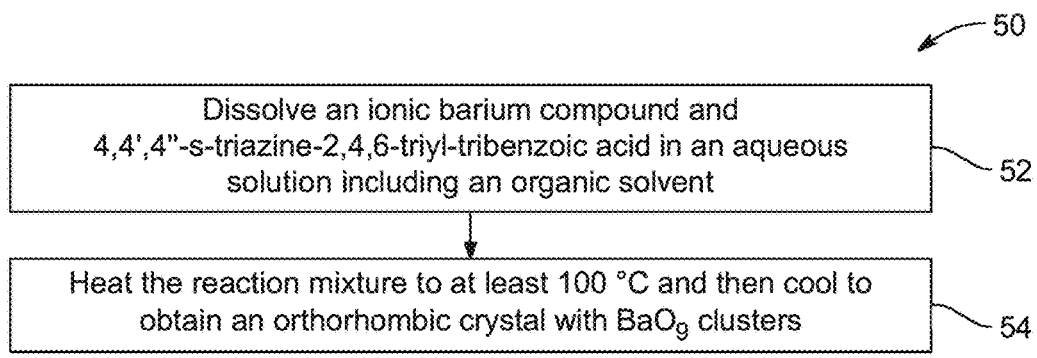
FIG. 1A is a schematic flowchart of a method of synthesizing a recyclable catalyst, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

As used herein, the term 'room temperature' refers to a temperature range of '25 degrees Celsius (° C.)±3° C. in the present disclosure.

As used herein, the term 'metal-organic crystallite' refers to a crystalline material composed of metal ions or clusters coordinated to organic ligands, forming a periodic network structure with defined porosity and functionality.

As used herein, the term 'average pore width' refers to a representative measure of the mean diameter of the pores within a porous material, typically determined using gas adsorption techniques and reflecting the material's internal surface structure and accessibility.

As used herein, the term '$CO_2$ adsorption rate' refers to the speed or rate at which carbon dioxide molecules are captured and adsorbed onto the surface or within the pores of a material under specified conditions of temperature and pressure.

As used herein, the term '$CO_2$ adsorption heat' refers to the amount of thermal energy released or absorbed when carbon dioxide molecules are adsorbed onto a material's surface, typically expressed in $kJ·mol^{-1}$, indicating the strength of interaction between $CO_2$ and the adsorbent.

As used herein, the term '$N_2$ adsorption rate' refers to the speed at which nitrogen gas molecules are adsorbed onto the surface or into the pores of a material under defined conditions of temperature and pressure, typically used to evaluate surface area and porosity characteristics.

As used herein, the term 'cycloaddition' refers to a chemical reaction in which two or more molecules, or parts of the same molecule, combine to form a cyclic product through the formation of new covalent bonds.

As used herein, the term 'reusability' refers to the ability of a material, such as a catalyst, to retain its functional performance and structural integrity over multiple cycles of use without significant loss in activity or efficiency.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

An aspect of the present disclosure is directed to a highly porous muffin-shaped barium-organic framework (BaTATB) for efficient $CO_2$ capture and its catalytic conversion to cyclic carbonates under mild, solvent-free conditions.

A recyclable catalyst for carbon dioxide capture is described. The catalyst includes a porous metal-organic crystallite. The porous metal-organic crystallite includes a porous complex of Ba ions and units of 4,4',4"-s-triazine-2,4,6-triyl-tribenzoic acid.

In some embodiments, the metal-organic crystallite may include metal ions such as $Zr^{4+}$, $Ti^{4+}$, $Fe^{3+}$, $Al^{3+}$, $Cu^{2+}$, $Zn^{2+}$, $Co^{2+}$, $Ni^{2+}$, $Mg^{2+}$, $Mn^{2+}$, $Cr^{3+}$, $V^{3+}$, $Cd^{2+}$, $Sr^{2+}$, $Ca^{2+}$, $Y^{3+}$, $In^{3+}$, $Gd^{3+}$, $La^{3+}$, and $Sn^{4+}$. In a preferred embodiment, the metal-organic crystallite includes a porous complex of Ba ions ($Ba^{2+}$ ion).

In some embodiments, the walls of the pores in the porous metal-organic crystallite may exhibit a variety of intricate structural patterns, each contributing to unique surface properties and adsorption characteristics. These may include square grid, triangular lattice, hexagonal close-packed, zigzag channels, spiral grooves, cross-hatched mesh, sawtooth ridges, wave-like undulations, starburst formations, radial symmetry, circular rings, elliptical pockets, rectangular trenches, labyrinthine mazes, diamond lattice, tetragonal tiling, cubic voids, pyramid-like steps, interlocked chevrons, and basket-weave textures. These patterns may be determined by the choice of metal centers, organic linkers, and synthesis conditions, and may influence functionalities such as gas diffusion, catalytic activity, or molecular sieving. In a preferred embodiment, walls of the pores of the porous metal-organic crystallite have a molecular honeycomb pattern formed by the porous complex.

In some embodiments, the pores of the molecular honeycomb pattern have an average pore width ranging from 17 to 19 Å, preferably 17.4 to 19 Å, preferably 17.8 to 19 Å, preferably 18 to 19 Å, preferably 18.4 to 19 Å, preferably 18.8 to 19 Å. In a preferred embodiment, the pores of the molecular honeycomb pattern have an average pore width of 17.80 Å and barium clusters as active metal sites.

In some embodiments, the recyclable catalyst has a BET surface area ranging from 1000 to 1100 $m^2g^{-1}$, preferably 1010 to 1100 $m^2g^{-1}$, preferably 1020 to 1100 $m^2g^{-1}$, preferably 1030 to 1100 $m^2g^{-1}$, preferably 1040 to 1100 $m^2g^{-1}$, preferably 1050 to 1100 $m^2g^{-1}$, preferably 1070 to 1100 $m^2g^{-1}$, preferably 1090 to 1100 $m^2g^{-1}$. In a preferred embodiment, the recyclable catalyst has a BET surface area of 1041 $m^2g^{-1}$.

In some embodiments, the recyclable catalyst has an average pore width ranging from 17 to 19 Å, preferably 17.4 to 19 Å, preferably 17.8 to 19 Å, preferably 18 to 19 Å, preferably 18.4 to 19 Å, preferably 18.8 to 19 Å. In a preferred embodiment, the recyclable catalyst has an average pore width of 18 Å.

In some embodiments, the recyclable catalyst has a $CO_2$ adsorption rate ranging from 3 to 6 $mmolg^{-1}$, preferably 3.2 to 6 $mmolg^{-1}$, preferably 3.5 to 6 $mmolg^{-1}$, preferably 3.7 to 6 $mmolg^{-1}$, preferably 4 to 6 $mmolg^{-1}$, preferably 4.2 to 6 $mmolg^{-1}$, preferably 4.5 to 6 $mmolg^{-1}$, preferably 4.7 to 6 $mmolg^{-1}$, preferably 5 to 6 $mmolg^{-1}$, preferably 5.2 to 6 $mmolg^{-1}$, preferably 5.5 to 6 $mmolg^{-1}$, preferably 5.7 to 6 $mmolg^{-1}$ at a temperature ranging from 0 to 25° C., preferably 5 to 25° C., preferably 10 to 25° C., preferably 15 to 25° C., preferably 20 to 25° C., preferably 22 to 25° C. In a preferred embodiment, the recyclable catalyst has a $CO_2$ adsorption rate of 5.1 $mmolg^{-1}$ at a temperature of 0° C.

In some embodiments, the recyclable catalyst has a $CO_2$ adsorption rate ranging from 3 to 6 $mmolg^{-1}$, preferably 3.2 to 6 $mmolg^{-1}$, preferably 3.5 to 6 $mmolg^{-1}$, preferably 3.7 to 6 $mmolg^{-1}$, preferably 4 to 6 $mmolg^{-1}$, preferably 4.2 to 6 $mmolg^{-1}$, preferably 4.5 to 6 $mmolg^{-1}$, preferably 4.7 to 6 $mmolg^{-1}$, preferably 5 to 6 $mmolg^{-1}$, preferably 5.2 to 6 $mmolg^{-1}$, preferably 5.5 to 6 $mmolg^{-1}$, preferably 5.7 to 6 $mmolg^{-1}$ at a temperature ranging from 0 to 25° C., preferably 5 to 25° C., preferably 10 to 25° C., preferably 15 to 25° C., preferably 20 to 25° C., preferably 22 to 25° C. In a preferred embodiment, the recyclable catalyst has a $CO_2$ adsorption rate of 3.1 $mmolg^{-1}$ at a temperature of 25° C.

In some embodiments, the recyclable catalyst has a $CO_2$ adsorption heat ranging from 30 to 40 $kJmol^{-1}$, preferably 32 to 40 $kJmol^{-1}$, preferably 34 to 40 $kJmol^{-1}$, preferably 35 to 40 $kJmol^{-1}$, preferably 37 to 40 $kJmol^{-1}$, preferably 39 to 40 $kJmol^{-1}$. In a preferred embodiment, the recyclable catalyst has a $CO_2$ adsorption heat of 36 $kJmol^{-1}$.

In some embodiments, the recyclable catalyst has a $N_2$ adsorption rate ranging from 0.03 to 0.5 $mmolg^{-1}$, preferably 0.05 to 0.5 $mmolg^{-1}$, preferably 0.1 to 0.5 $mmolg^{-1}$, preferably 0.2 to 0.5 $mmolg^{-1}$, preferably 0.3 to 0.5 $mmolg^{-1}$, preferably 0.4 to 0.5 $mmolg^{-1}$, at a temperature ranging from 0 to 25° C., preferably 5 to 25° C., preferably 10 to 25° C., preferably 15 to 25° C., preferably 20 to 25° C., preferably 22 to 25° C. In a preferred embodiment, the recyclable catalyst has a $N_2$ adsorption rate of 0.31 $mmolg^{-1}$ at a temperature of 0° C.

In some embodiments, the recyclable catalyst has a $N_2$ adsorption rate ranging from 0.03 to 0.5 $mmolg^{-1}$, preferably 0.05 to 0.5 $mmolg^{-1}$, preferably 0.1 to 0.5 $mmolg^{-1}$, preferably 0.2 to 0.5 $mmolg^{-1}$, preferably 0.3 to 0.5 $mmolg^{-1}$, preferably 0.4 to 0.5 $mmolg^{-1}$, at a temperature ranging from 0 to 25° C., preferably 5 to 25° C., preferably 10 to 25° C., preferably 15 to 25° C., preferably 20 to 25° C., preferably 22 to 25° C. In a preferred embodiment, the recyclable catalyst has a $N_2$ adsorption rate of 0.05 $mmolg^{-1}$ at a temperature of 25° C.

A method of synthesizing the recyclable catalyst is described in FIG. 1A. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes dissolving an ionic barium compound and 4,4',4''-s-triazine-2,4,6-triyl-tribenzoic acid in an aqueous solution including an organic solvent. In some embodiments, the ionic barium compound may include barium chloride, barium sulfate, barium carbonate, barium hydroxide, barium bromide, barium iodide, barium fluoride, barium acetate, barium oxalate, barium thiocyanate, barium chromate, barium dichromate, barium phosphate, barium hydrogen phosphate, barium metaphosphate, barium silicate, barium titanate, barium ferrite, barium aluminate, barium stannate, barium tungstate, barium molybdate, barium borate, barium selenate, barium tellurate, barium azide, barium cyanide, barium permanganate, barium hypochlorite, and barium formate. In one embodiment, the ionic barium compound is at least one selected from barium nitrate ($Ba(NO_3)_2$), barium chloride ($BaCl_2$), barium sulfate ($BaSO_4$), barium carbonate ($BaCO_3$), barium oxide (BaO), and barium chromate ($BaCrO_4$). In a preferred embodiment, the ionic barium compound is barium nitrate ($Ba(NO_3)_2$). In some embodiment, concentration of ($Ba(NO_3)_2$) may range from 0.001 to 0.1 M, preferably 0.01 to 0.1 M, preferably 0.02 to 0.1 M, preferably 0.04 to 0.1 M, preferably 0.05 to 0.1 M, preferably 0.07 to 0.1 M, preferably 0.09 to 0.1 M. In a preferred embodiment, concentration of ($Ba(NO_3)_2$) is 0.015 M.

In some embodiments, the triyl-tribenzoic acid may include, but is not limited to, 1,3,5-tris(4-carboxyphenyl)benzene, benzene-1,3,5-triyl-tribenzoic acid, trimesic acid, 1,3,5-tris(4-carboxyphenyl)triazine, 1,3,5-tris(4-carboxyphenyl)ethane, 1,3,5-tris(4-carboxyphenyl)propane, 1,3,5-tris(3-carboxyphenyl)benzene, 1,3,5-tris(4-carboxyphenyl)cyclohexane, 1,3,5-tris(4-carboxyphenyl)pyridine, 1,3,5-tris(4-carboxyphenyl)phenylmethane, 1,3,5-tris(3,5-dicarboxyphenyl)benzene, triphenylamine-3,3',3''-tricarboxylic acid, triphenylmethane-3,3',3''-tricarboxylic acid, triptycene-tricarboxylic acid, truxene-tribenzoic acid, tri(4-carboxyphenyl)amine, tri(4-carboxyphenyl)borane, 1,3,5-tris(4-carboxyphenylethynyl)benzene, triphenylene-2,3,6-tricarboxylic acid, and tris(4-carboxyphenyl)phosphine oxide. In a preferred embodiment, the triyl-tribenzoic acid is 4,4'4''-s-triazine-2,4,6-triyl-tribenzoic acid ($H_3TATB$). In some embodiment, concentration of 4,4'4''-s-triazine-2,4,6-triyl-tribenzoic acid may range from 0.001 to 0.1 M, preferably 0.01 to 0.1 M, preferably 0.02 to 0.1 M, preferably 0.04 to 0.1 M, preferably 0.05 to 0.1 M, preferably 0.07 to 0.1 M, preferably 0.09 to 0.1M. In a preferred embodiment, concentration of 4,4'4''-s-triazine-2,4,6-triyl-tribenzoic acid is 0.001M.

In some embodiments, the organic solvent may include, but is not limited to, dimethyl sulfoxide, acetone, methanol, ethanol, propanol, isopropanol, butanol, tert-butanol, acetonitrile, tetrahydrofuran, dichloromethane, chloroform, diethyl ether, ethyl acetate, methyl acetate, benzene, toluene, xylene, hexane, heptane, cyclohexane, 1,4-dioxane, formic acid, acetic acid, trifluoroacetic acid, N-methyl-2-pyrrolidone (NMP), 1,2-dimethoxyethane (DME), ethylene glycol, propylene carbonate, and butyrolactone. In a preferred embodiment, the organic solvent is DMF (dimethylformamide) and water. In some embodiment, ratio of solvent (DMF:water) may ranges from 1:1 to 1:10, preferably 1:2 to 1:10, preferably 1:4 to 1:10, preferably 1:5 to 1:10, preferably 1:7 to 1:10, preferably 1:8 to 1:10, preferably 1:9 to 1:10. In a preferred embodiment, ratio of DMF:water is 9:1.

At step 54, the method 50 includes heating the reaction mixture to at least 100° C. and then cooling to obtain an orthorhombic crystal with $BaO_9$ clusters. In some embodiments, the reaction mixture is heated to at least 100° C., preferably at least 105° C., preferably at least 110° C., preferably at least 115° C., preferably at least 120° C., preferably at least 125° C., preferably at least 130° C. In a preferred embodiment, the reaction mixture is heated at 130° C. In some embodiments, heating is done for 30 hours, preferably 32 hours, preferably 35 hours, preferably 38 hours, preferably 40 hours, preferably 42 hours, preferably 45 hours, preferably 48 hours, preferably 50 hours. In some embodiment, heating is done for 48 hours.

In some embodiments, the cooling may be performed at temperatures ranging from 5 to 40° C., preferably 10 to 40° C., preferably 15 to 40° C., preferably 20 to 40° C., preferably 25 to 40° C., preferably 30 to 40° C., preferably 35 to 40° C. In a preferred embodiment, the cooling may be performed at 30° C.

Figure 1B:
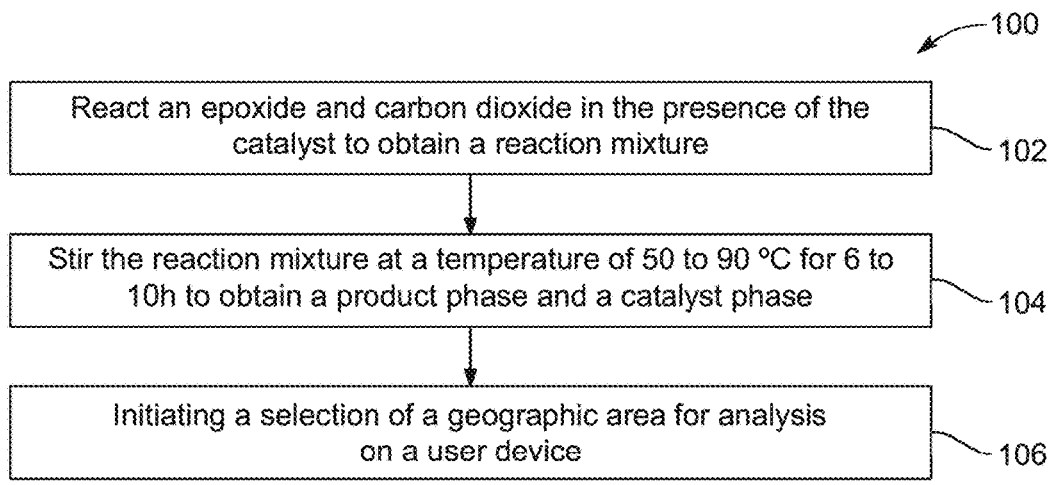
FIG. 1B is a schematic flowchart of a method of cycloaddition of carbon dioxide without a co-catalyst, according to certain embodiments.

FIG. 1B illustrates a schematic flow chart of a method 100 of cycloaddition of carbon dioxide without a co-catalyst. The order in which the method 100 is described is not intended to be construed as a limitation, and any number of the described method steps can be combined to implement the method 100. Additionally, individual steps may be removed or skipped from the method 100 without departing from the spirit and scope of the present disclosure.

At step 102, the method 100 includes reacting an epoxide and carbon dioxide in the presence of the catalyst to obtain a reaction mixture. In some embodiments, the epoxide may include, but is not limited to, ethylene oxide, propylene oxide, butylene oxide, epichlorohydrin, cyclohexene oxide, 1,2-epoxybutane, 1,2-epoxyhexane, 1,2-epoxyoctane, glycidol, glycidyl methacrylate, glycidyl ether, phenyl glycidyl ether, allyl glycidyl ether, diglycidyl ether, epoxycyclohexane, bisphenol A diglycidyl ether, trimethylene oxide, tetrahydrofuran monoxide, methyloxirane, and epoxydecane. In one embodiment, the epoxide has at least one substituent consisting of alkyl group, phenyl group, alkyl halides, alkyl oxides. In a preferred embodiment, the epoxide is styrene oxide. In a preferred embodiment, the epoxide has the following formula

In some embodiments, the R group of the epoxide may include, but is not limited to, methyl, ethyl, propyl, isopropyl, butyl, tert-butyl, pentyl, cyclohexyl, benzyl, phenyl, naphthyl, allyl, propargyl, hydroxyethyl, methoxyethyl, chloroethyl, fluorophenyl, carboxymethyl, aminoethyl, and methacryloyl. In one embodiment, R group may include —$CH_3$, —$CH_2CH_3$, —$CH_2CH_2CH_3$, -Cy, —$C_6H_5$, —$CH_2Cl$, —$CH_2OCH_2CH$=$CH_2$, —$CH_2OC_6H_5$. In a preferred embodiment, R group is phenyl (—$C_6H_5$).

In some embodiments, the organic solvent may include, but is not limited to, dimethyl sulfoxide, acetone, methanol, ethanol, propanol, isopropanol, butanol, tert-butanol, acetonitrile, tetrahydrofuran, dichloromethane, chloroform, diethyl ether, ethyl acetate, methyl acetate, benzene, toluene, xylene, hexane, heptane, cyclohexane, 1,4-dioxane, formic acid, acetic acid, trifluoroacetic acid, N-methyl-2-pyrrolidone (NMP), 1,2-dimethoxyethane (DME), ethylene glycol, propylene carbonate, and butyrolactone. In a preferred embodiment, the reaction mixture is solvent free.

In some embodiments, the epoxide reacts with carbon dioxide at a pressure of at least 0.2 bar, preferably of at least 0.4 bar, preferably of at least 0.5 bar, preferably of at least 0.7 bar, preferably of at least 0.9 bar, preferably of at least 1 bar. In a preferred embodiment, the epoxide reacts with carbon dioxide at a pressure of 1 bar.

At step 104, the method 100 includes stirring the reaction mixture at a temperature of 50 to 90° C. for 6 to 10 h to obtain a product phase and a catalyst phase. In some embodiments, reaction mixture is stirred at a temperature ranging from 50 to 90° C., preferably 55 to 90° C., preferably 60 to 90° C., preferably 65 to 90° C., preferably 70 to 90° C., preferably 75 to 90° C., preferably 80 to 90° C., preferably 85 to 90° C. In a preferred embodiment, reaction mixture is stirred at a temperature of 70° C. In some embodiments, the reaction mixture is stirred for 6 to 10 h, preferably for 6.5 to 10 h, preferably for 7 to 10 h, preferably for 7.5 to 10 h, preferably for 8 to 10 h, preferably for 8.5 to 10 h, preferably for 9 to 10 h, preferably for 9.5 to 10 h. In a preferred embodiment, reaction mixture is stirred for 8 hours.

At step 106, the method 100 includes separating the product phase from the catalyst phase, then drying the product phase to obtain a cyclic carbonate. In some embodiments, the product phase may be separated from the catalyst phase by diluting with solvents such as ethyl acetate, dichloromethane, acetone, hexane, heptane, toluene, diethyl ether, tetrahydrofuran (THF), methanol, ethanol, propanol, isopropanol, butanol, acetonitrile, dimethyl sulfoxide (DMSO), 1,4-dioxane, ethyl ether, methyl tert-butyl ether (MTBE), n-butyl acetate, and cyclohexane. In a preferred embodiment, the product phase is separated from the catalyst phase by diluting with chloroform.

In some embodiment, the method of present disclosure yields at least 50 mole % of cyclic carbonate based on the amount of the epoxide. In some embodiments, when the epoxide is styrene oxide, the method of the present disclosure yields least 90 mole %, at least 91 mole %, at least 92 mole %, at least 93 mole %, at least 94 mole %, at least 95 mole %, at least 96 mole %, at least 97 mole %, at least 98 mole % of cyclic carbonate, based on the amount of the epoxide. In a preferred embodiment, the method of present disclosure yields about 95 mole % of cyclic carbonate, based on the amount of the epoxide.

In some embodiments, the method further includes reacting the reaction mixture with one or more amines to form a heterocyclic oxazolidinone.

In some embodiments, the method further includes washing the catalyst phase with an organic solvent and then vacuum drying the catalyst at a temperature of 110 to 130° C. to obtain recycled catalyst. In some embodiments, the alcohol based organic solvent may include, but is not limited to, ethanol, propanol, isopropanol, butanol, sec-butanol, tert-butanol, pentanol, hexanol, cyclohexanol, benzyl alcohol, phenethyl alcohol, allyl alcohol, furfuryl alcohol, ethylene glycol, diethylene glycol, triethylene glycol, 1,2-propanediol, 1,3-propanediol, 1,4-butanediol, glycerol, 2-methyl-1-propanol, 2-butanol, 3-pentanol, neopentyl alcohol, isoamyl alcohol, tert-amyl alcohol, methylcyclohexanol, phenol, resorcinol, and catechol. In a preferred embodiment, the organic solvent is an alcohol, more preferably methanol.

In some embodiments, the catalyst may be dried by air drying, oven drying, freeze drying, spray drying, microwave drying, infrared drying, sun drying, nitrogen purging, argon purging, desiccator drying, supercritical $CO_2$ drying, lyophilization, fluidized bed drying, thermal drying, rotary drying, convection drying, conductive drying, hot plate drying, flash drying, and tumble drying. In a preferred embodiment, the catalyst is dried by vacuum drying. In some embodiments, the catalyst is vacuum dried at a temperature ranging from 110 to 130° C., preferably 112 to 130° C., preferably 114 to 130° C., preferably 116 to 130° C., preferably 118 to 130° C., preferably 120 to 130° C., preferably 124 to 130° C., preferably 128 to 130° C. In a preferred embodiment, catalyst is vacuum dried at a temperature of 100° C.

In some embodiments, the catalyst is reused at least 9 times, preferably at least 8 times, preferably at least 7 times, preferably at least 6 times, preferably at least 5 times, preferably at least 4 times, preferably at least 3 times, preferably at least 2 times, preferably at least 1 time. In a preferred embodiment, the catalyst is reused 9 times.

In some embodiments, the recycled catalyst converts at least 95 mole %, preferably at least 96 mole %, preferably at least 97 mole %, preferably at least 98 mole %, preferably at least 99 mole %, styrene oxide after at least 9 cycles. In a preferred embodiment, the recycled catalyst converts 98 mole %, styrene oxide after at least 9 cycles.

The following examples are provided solely for illustration and are not to be construed as limitations of the present disclosure, as many variations thereof are possible without departing from the spirit and scope of the present disclosure.

EXAMPLES

The following examples demonstrate a recyclable catalyst as described herein. The examples are provided solely for illustration and are not to be construed as limitations of the present disclosure, as many variations thereof are possible without departing from the spirit and scope of the present disclosure.

Example 1: Materials and General Methods

Chemicals used in the disclosure: barium nitrate (>99%), cyanuric chloride (99%) toluene (99.8%), aluminum chloride (anhydrous, 99.99%), chromium oxide (>98.0%), acetic acid (>99%), acetic anhydride (>99%), 1,3,5-tris(4-carboxyphenyl) benzene (>98.0%), methanol (99.9% purity), N,N-dimethylformamide (DMF; 99.8% purity), dichloromethane (99.8% extra dry grade), aniline (99%) with all the other aromatic amines, and 1,2-epoxyhexane (97%) with all the other epoxides were purchased from Sigma Aldrich Corporation. Nuclear Magnetic Resonance (NMR) solvents: Chloroform-d ($CDCl_3$; 99.9% purity) and dimethyl sulfoxide-d6 (DMSO-$d_6$; 99.9% purity) were purchased from Cambridge Isotope. All chemicals were used without further purification. $CO_2$ (99.99%) was purchased from Air Liquide. Water used in the disclosure was double distilled and filtered through a millipore membrane.

Example 2: Instrumentation

Single crystal X-ray structure analysis experimental part: A suitable single crystal of barium 1,3,5-triamino-2,4,6-trinitrobenzene (BaTATB) was mounted on a Bruker AXSD8 Quest diffractometer, equipped with a four-circle goniometer, and using MoKα graphite mono-chromated radiation [0.71073 angstrom (Å)]. The data were collected at 298 kelvin (K) and corrected for absorption using a multi-scan method (SADABS) [Schwartzman, A.; Keeling, R. F., 2020, *Nature Climate Change*, 10, 416-417, incorporated herein by reference in its entirety]. The structure solutions were obtained by direct methods using SHELXS-97 [Jiang, J.; Ye, B.; Liu, J., 2019, *Applied Energy*, 235, 186-203, incorporated herein by reference in its entirety] and the refinements were performed by fullmatrix least squares procedures on $F^2$ using the program SHELXL-97 [IEA. Emissions by sector—greenhouse gas emissions from energy: overview—analysis, incorporated herein by reference in its entirety]. The graphical illustrations were performed using ORTEP-3 [Qiu, L.; Li, H.; He, L., 2023, *Accounts of Chemical Research*, 56, 2225-2240, incorporated herein by reference in its entirety] or Mercury 4.0 [Roy, P.; Mohanty, A. K.; Misra, M., 2023, *Environmental Science: Advances*, 2, 409-423, incorporated herein by reference in its entirety], and the crystal data and refinement details for BaTATB are included in Table 1.

TABLE 1

| Crystal data and structure refinement for BaTATB | |
|---|---|
| Empirical formula | $C_{51} H_{39} Ba_2 N_7 O_{16}$ |
| Formula weight | 1280.57 |
| Temperature | 307(2) K |
| Wavelength | 0.71073 Å |
| Crystal system | Orthorhombic |
| Space group | P na $2_1$ |
| Unit cell dimensions | a = 7.2925(2) Å |
| | b = 18.6823(4) Å |
| | c = 25.1482(6) Å |
| Volume | 3426.21(14) Å$^3$ |
| Z | 2 |
| Density (calculated) | 1.241 g/cm$^3$ |
| Absorption coefficient | 1.201 mm$^{-1}$ |
| F(000) | 1268 |
| Theta range for data collection | 2.663° to 34.395°. |
| Index ranges | −11 ≤ h ≤ 11, −29 ≤ k ≤ 29, −39 ≤ l ≤ 39 |
| Reflections collected | 120925 |
| Independent reflections | 14376 [R(int) = 0.0709] |
| Completeness to theta = 25.242° | 99.80% |
| Absorption correction | Semi-empirical from equivalents |
| Max. and min. transmission | 0.965 and 0.837 |
| Refinement method | Full-matrix least-squares on $F^2$ |
| Data/restraints/parameters | 14376/7/342 |
| Goodness-of-fit on $F^2$ | 1.053 |
| Final R indices [I > 2sigma(I)] | R1 = 0.0452, wR2 = 0.0991 |
| R indices (all data) | R1 = 0.0764, wR2 = 0.1070 |
| Largest diff. peak and hole | 0.974 and −2.148 e · Å$^{-3}$ |

Powder X-ray diffraction (PXRD) patterns of the samples were recorded using a Rigaku MiniFlex diffractometer equipped with Cu-Kα radiation. The data were acquired over the 2θ range of 5° and 30°. Thermogravimetric analysis (TGA) was conducted using a SDT-Q600 (TA instruments). In the present disclosure, an activated sample of BaTATB (10 mg) was heated in an alumina pan under airflow [60 milliliter per minute (mL min$^{-1}$)] with a gradient of 10 degree celsius per minute (° C. min$^{-1}$) in the temperature range of 30° C.-800° C. The surface morphology of the materials was discerned using a field emission scanning electron microscope (FESEM, LYRA 3 Dual Beam, Tescan), which operated at 30 kV. The FESEM samples were prepared on alumina stubs using double-sided conductive copper tape coated with gold. The samples were prepared for analysis by dispersing the samples into ethanol, then dropping them onto an SEM stub, and finally drying them under light. Energy-dispersive X-ray spectra (EDS) were collected using a Lyra 3 (TESCAN, Czech Republic) attachment to the FESEM for elemental identification and mapping. High-resolution transmission electron microscopy (HRTEM) images were obtained using a JEOL JEM2100F transmission electron microscope. The Transmission Electron Microscopy (TEM) samples were prepared by dropping the samples from an ethanolic suspension onto a copper grid and allowing them to dry at room temperature. The surface area was obtained from the nitrogen adsorption isotherm of the metal-organic framework (MOF) by using Micromeritics 3Flex surface area and porosity analyzer. A liquid nitrogen bath was used for measurements at 77 K. $CO_2$ sorption isotherms were measured on a Micromeritics 3Flex instrument. The measurement temperatures at 273 K and 298 K were controlled with a water circulator. The BaTATB (200 mg) was activated at 423 K under vacuum for 12 h. The surface chemical analyses were performed using an X-ray photoelectron spectroscopy (XPS) equipped with an Al-Kα micro-focusing X-ray monochromator (ESCALAB 250Xi XPS Microprobe, Thermo Scientific, USA). Temperature-programmed desorption (TPD) profiles of ammonia ($NH_3$) from the BaTATB were conducted on a BELCAT II version 2.3.0.0 equipped with a thermal conductivity detector (TCD) detector. A sample of 50 mg was pretreated in helium (He) at 300° C. for 2 h. After being cooled to 100° C., the sample was exposed to 7.10% $NH_3/N_2$ for 30 min, followed by flushing with helium (He) at 100° C. for 15 min to remove physically adsorbed ammonia, and then cooled down to 50° C. $NH_3$-TPD was measured from 60° C. to 610° C. in a He flow at 10° C./min. TPD profiles of $CO_2$ from BaTATB were conducted on a BELCAT II version 2.3.0.0 equipped with a TCD detector. Similarly, the sample was pretreated in He at 300° C. for 2 h. After being cooled to 100° C., the sample was exposed to $CO_2$ for 30 min, followed by flushing with He at 100° C. for 15 min to remove physically adsorbed $CO_2$, and then cooled to 50° C. $CO_2$-TPD was measured from 60° C. to 400° C. in a He flow at 20° C./min.

Example 3: General Procedure for the Synthesis of Cyclic Carbonates

Completely activated BaTATB material (45 mg) and epoxide (10.0 mmol) were added to a 50 mL size Schlenk tube at room temperature. Then, $CO_2$ (1 bar) was introduced using a ballon, and the reaction was stirred at 70° C. for 8 h. After completion, the mixture was cooled to room temperature. Then, the reaction mixture was diluted with chloroform and centrifuged to separate the catalysts. The respective pure form of cyclic carbonates was dried and analyzed by proton nuclear magnetic resonance ($^1$HH NMR) and carbon-13 nuclear magnetic resonance ($^{13}$C NMR).

Example 4: Selectivity

The selectivity of the products was analyzed using $^1$H NMR spectroscopy of the product without any purification, based on the integration of the Ph-CH—O— signal of styrene carbonate (A7).

Example 5: Reusability Test

To reuse the catalysts after completion of the reaction, the reaction mixture was diluted with chloroform, and the catalysts were recovered by simple centrifugation [8000 revolutions per minute (rpm)]. Recovered catalysts were washed with methanol 10 mL (to remove any remaining substrate) three times, then dried under vacuum at 100° C. overnight. The reaction conditions were kept the same as used in the first cycle.

Example 6: Synthesis of linker [FIG. 2. Synthetic scheme of 4,4',4'-s-triazine-2,4,6-tribenzoic acid ($H_3$TATB)]

2,4,6-tri-p-tolyl-1,3,5-triazine (1): In a three-neck flask, aluminum trichloride ($AlCl_3$) (2.0 g) was dissolved in dry toluene and heated to 60° C. Cyanuric chloride ($C_3N_3Cl_3$) (0.83 g) was then added portion-wise for an hour, and the mixture was stirred overnight. The resulting red sticky oil was poured into large ice water to quench the catalyst and extracted with chloroform ($CHCl_3$). After removing the solvent, a crude product was precipitated out from methanol to yield a needle-like solid. The resulting solid was recrystallized from hot toluene to afford a white needle-like crystalline solid (1.0 g, 63%). $^1$H NMR (400 MHz, $CDCl_3$) δ 8.68 (d, J=8.4 Hz, 6H, ArH), 7.39 (d, J=8.0 Hz, 6H, ArH), 2.51 (s, 9H, $CH_3$). $^{13}$C NMR (400 MHz, $CDCl_3$) δ 22.2, 128.4, 128.9, 133.1, 170.3.

4,4',4''-s-triazine-2,4,6-tribenzoic acid (H3TATB): To a 500 mL three-necked flask, 1 (2.78 g) was dissolved in acetic acid (70 mL), and then 4.4 mL of sulfuric acid ($H_2SO_4$) was added. A solution of chromium oxide (7.2 g) in acetic anhydride (4.8 mL) was carefully added to the reaction flask with an ice bath. The resulting dark green slurry was stirred overnight. The reaction mixture was poured into 250 mL cold water, stirred 1 h to well mixed, and filtered. The solids were washed with water to remove chromium acid. The white solid was dissolved in 200 mL 2 M sodium hydroxide (NaOH) solution. After the unreacted starting material was removed by filtration, the solution was acidified with 6 M hydrochloride (HCl) solution to give a white crude product (until pH<3). The resulting crude product was then filtered and dried. Recrystallization from DMF afforded the pure product as a white solid (3.0 g, 86%). $^1$H NMR (400 MHz, DMSO-$d_6$) δ 8.72 (d, J=8.4 Hz, 6H, ArH), 8.13 (d, J=8.4 Hz, 6H, ArH). $^{13}$C NMR (400 MHz, DMSO-$d_6$) δ 128.7, 131.2, 141.9, 145.0, 168.1, 172.9.

Example 7: Synthesis of the BaTATB Crystals

BaBATB was synthesized according to the method given in the literature. Its purity was confirmed by X-ray powder diffraction (XRD).

A mixture of barium nitrate ($Ba(NO_3)_2$) (20 mg, 0.07 mmol) and $H_3$TATB (3 mg, 0.005 mmol) was dissolved in 5 mL mixed solvent of dimethylformamide (DMF) and water (9:1). Then, the solution was sealed in a vial and slowly heated to 130° C. from room temperature in 8 hours, kept at 130° C. for 48 hours, and then slowly cooled to 30°

C. in 13 hours. The colorless crystals of BaTATB were collected, washed with DMF and methanol, and dried in the air. (Yield: 57%, based on barium.). Elemental analysis (%) for BaTATB ($C_{27}H_{19}BaN_4O_7$): Calcd: C, 49.98; H, 2.95; N, 8.64; Found: C, 49.67, H, 2.60, N, 8.36. FT-IR (KBr, cm$^{-1}$) 490, 534, 658, 694, 767, 1019, 1101, 1277, 1359, 1394, 1524, 1612, 1665, 3408.

TABLE 2

Selected bond lengths [Å] and bond angles [°] for BaTATB

| | |
|---|---|
| Ba(1)-O(5)#1 | 2.720 (4) |
| Ba(1)-O(2)#2 | 2.760 (3) |
| Ba(1)-O(8) | 2.782 (6) |
| Ba(1)-O(2)#3 | 2.809 (3) |
| Ba(1)-O(4)#4 | 2.818 (4) |
| Ba(1)-O(1)#3 | 2.824 (4) |
| Ba(1)-O(1) | 2.851 (4) |
| Ba(1)-O(3)#5 | 2.863 (4) |
| Ba(1)-O(3)#4 | 2.923 (3) |
| O(5)#1-Ba(1)-O(2)#2 | 104.48 (12) |
| O(5)#1-Ba(1)-O(8) | 83.8 (2) |
| O(2)#2-Ba(1)-O(8) | 71.17 (16) |
| O(5)#1-Ba(1)-O(2)#3 | 141.88 (12) |
| O(2)#2-Ba(1)-O(2)#3 | 112.92 (9) |
| O(8)-Ba(1)-O(2)#3 | 101.1 (2) |
| O(5)#1-Ba(1)-O(4)#4 | 81.55 (12) |
| O(2)#2-Ba(1)-O(4)#4 | 68.64 (11) |
| O(8)-Ba(1)-O(4)#4 | 131.77 (19) |
| O(2)#3-Ba(1)-O(4)#4 | 118.33 (11) |
| O(5)#1-Ba(1)-O(1)#3 | 162.27 (13) |
| O(2)#2-Ba(1)-O(1)#3 | 68.06 (10) |
| O(8)-Ba(1)-O(1)#3 | 78.6 (2) |
| O(2)#3-Ba(1)-O(1)#3 | 45.80 (10) |
| O(4)#4-Ba(1)-O(1)#3 | 108.96 (12) |
| O(5)#1-Ba(1)-O(1) | 78.67 (12) |
| O(2)#2-Ba(1)-O(1) | 143.81 (12) |
| O(8)-Ba(1)-O(1) | 73.43 (17) |
| O(2)#3-Ba(1)-O(1) | 67.01 (10) |
| O(4)#4-Ba(1)-O(1) | 145.66 (12) |
| O(1)#3-Ba(1)-O(1) | 97.88 (13) |
| O(5)#1-Ba(1)-O(3)#5 | 83.30 (12) |
| O(2)#2-Ba(1)-O(3)#5 | 147.96 (11) |
| O(8)-Ba(1)-O(3)#5 | 140.86 (16) |
| O(2)#3-Ba(1)-O(3)#5 | 69.08 (10) |
| O(4)#4-Ba(1)-O(3)#5 | 82.22 (11) |
| O(1)#3-Ba(1)-O(3)#5 | 111.75 (10) |
| O(1)-Ba(1)-O(3)#5 | 67.86 (12) |
| O(5)#1-Ba(1)-O(3)#4 | 126.27 (12) |
| O(2)#2-Ba(1)-O(3)#4 | 68.87 (10) |
| O(8)-Ba(1)-O(3)#4 | 134.69 (17) |
| O(2)#3-Ba(1)-O(3)#4 | 76.17 (11) |
| O(4)#4-Ba(1)-O(3)#4 | 45.50 (11) |
| O(1)#3-Ba(1)-O(3)#4 | 67.39 (12) |
| O(1)-Ba(1)-O(3)#4 | 138.26 (10) |
| O(3)#5-Ba(1)-O(3)#4 | 81.39 (8) |

Symmetry Transformations Used to Generate Equivalent Atoms:

1 x+1/2,−y+3/2,z #2 x+1,y,z #3 x+1/2,−y+1/2,z #4 −x+5/2,y−1/2,z+1/2 #5 −x+2,−y+1,z+1/2 #6 x−1/2,−y+1/2,z #7 x−1,y,z #8 −x+2,−y+1,z−1/2 #9 −x+5/2,y+1/2,z−1/2 #10 x−1/2,−y+3/2,z

Example 8: Synthesis of the MOF BaTATB

Figure 2:
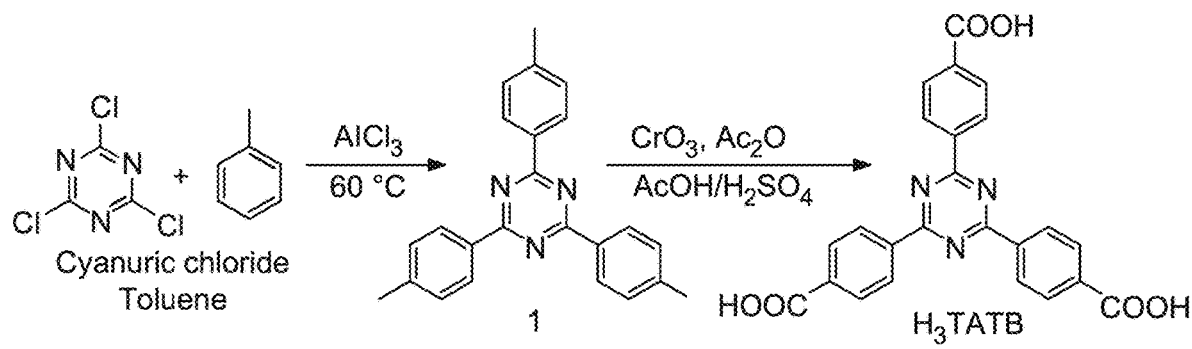
FIG. 2 is a synthetic scheme of 4',4''-s-triazine-2,4,6-triyl-tribenzoic acid ($H_3TATB$), according to certain embodiments.
Figure 3A:
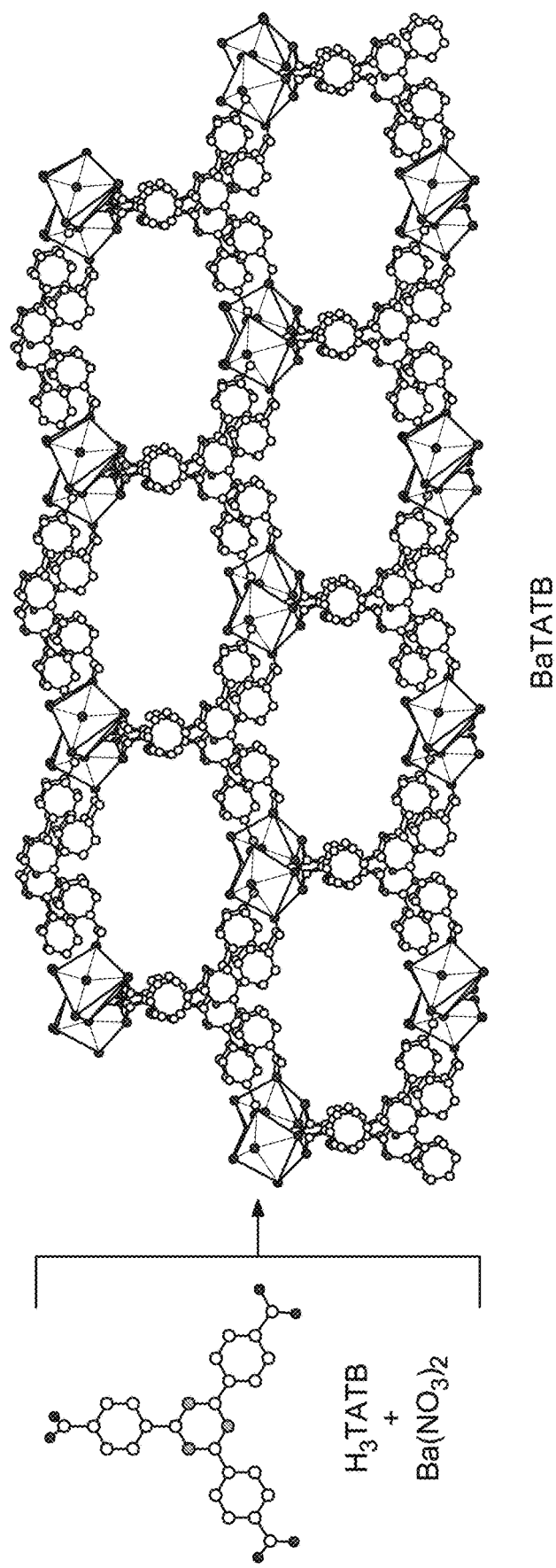
FIG. 3A depicts a single-crystal structure of BaTATB constructed from $H_3TATB$, and $Ba^{2+}$ building blocks, according to certain embodiments.
Figure 3B:
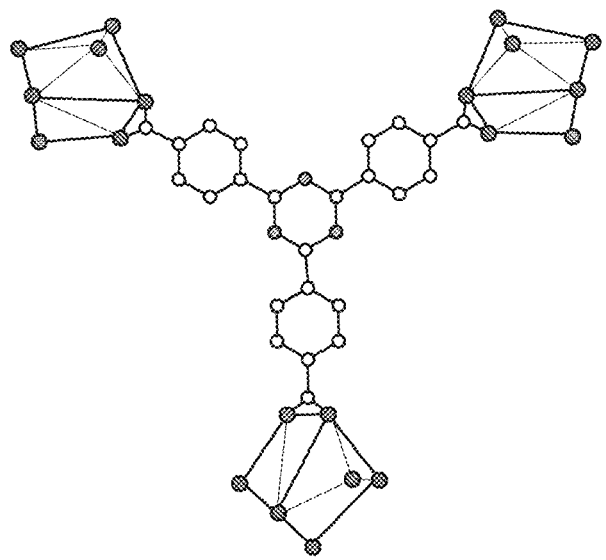
FIG. 3B depicts a single unit showing the binding of the $H_3TATB$ with $Ba^{2+}$, according to certain embodiments.
Figure 3C:
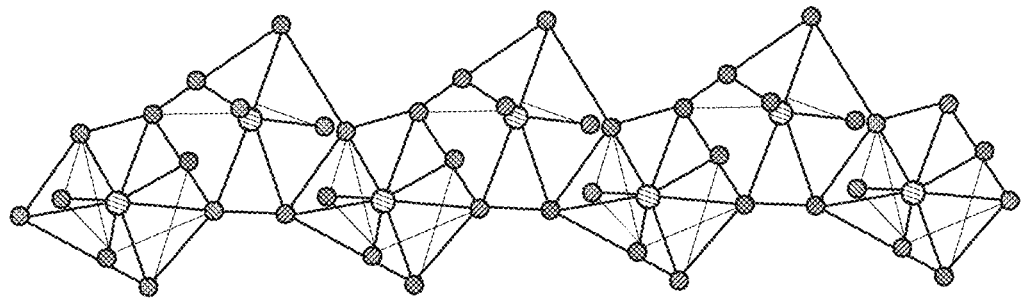
FIG. 3C depicts an inorganic secondary building unit, including $BaO_9$, according to certain embodiments.

The linker $H_3$TATB (4,4',4''-s-triazine-2,4,6-triyl-tribenzoic acid) was synthesized according to the procedure mentioned in literature [Srinivasappa, P. M.; et al., 2023, Energy & Fuels, 37(18), 14116-14130, incorporated herein by reference in its entirety] and characterized by the $^1$HNMR and $^{13}$CNMR, as shown in FIG. 2. The reaction of $Ba(NO_3)$ with a tricarboxylate ligand $H_3$TATB in a mixed solvent of DMF and water (9:1) at 130° C. produces colorless crystals of $[Ba(HTATB)(H_2O)_{0.5}(DMF)_{0.5}]\cdot(H_2O)$, as shown in FIG. 3A-3C.

Example 9: Crystal Structure Description of BaTATB

The compound of the formula $[Ba(HTATB)(H_2O)_{0.5}(DMF)_{0.5}]\cdot(H_2O)$ crystallizes in $Pna2_1$ space group. The Cambridge Crystallographic Data Centre (CCDC) deposition number is 2289204. The asymmetric unit contains one HTATB$^{2-}$ ligand, one Ba$^{2+}$ ion, half coordinating water, and DMF molecules, in addition to a hydration water molecule. The barium ion is 9-coordinate. The coordination sphere includes eight HTATB$^{2-}$ oxygen atoms, in addition to a disordered binding site occupied ½/½ by ligating water and a DMF molecule. The coordination geometry is consistent with a distorted muffin polyhedron [Liang, J.; Huang, Y. B.; Cao, R. 2019, Coordination Chemistry Reviews, 378, 32-65, incorporated herein by reference in its entirety]. The Ba—O bond distances are in the range 2.720(4) Å-2.923(3) Å. The HTATB$^{2-}$ carboxylate groups adopt a bridging mode towards Ba$^{2+}$ ions to generate one-dimensional columns of [BaO9] polyhedra along the a-axis direction, as shown in FIG. 4A-4D. Each HTATB$^{2-}$ ligand is interconnecting three [BaO$_9$] polyhedral columns, giving rise to three-dimensional honeycomb architecture, as shown in FIG. 3A-3C. In BaTATB, the 9$^{th}$ coordination site is a disordered binding site occupied 50% by ligating water and 50% by DMF molecule, and the cell parameters are a=7.2925(2) Å, b=18.6823(4) Å, c=25.1482(6) Å, Volume 3426.21(14) Å3. The presence of solvent and water molecules in the coordination sites of the barium induces a significant difference in the properties with respect to the stability, activation, and generation of open metal sites. The crystallographic data and structure refinement parameters are provided in Table 1 and the bond lengths and angles of the BaTATB are given in Table 2.

Figure 5A:
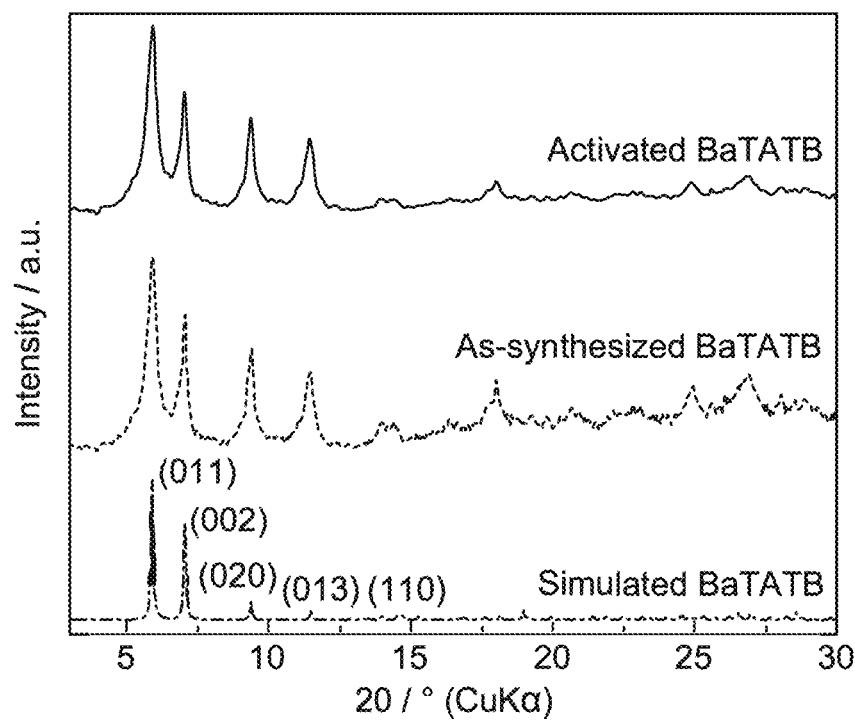
FIG. 5A depicts a powder X-ray diffraction (PXRD of BaTATB) as simulated from single-crystal X-ray diffraction (XRD) data, as-synthesized, and upon activation according to certain embodiments.
Figure 5B:
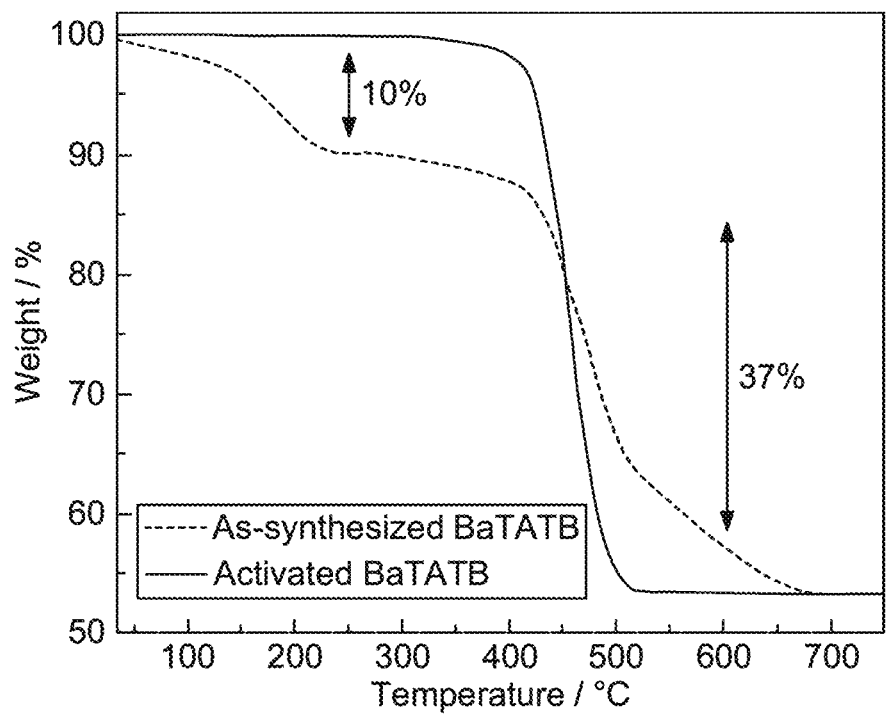
FIG. 5B depicts a thermogravimetric analysis of as synthesized and activated BaTATB, according to certain embodiments.

Powder X-ray diffractions of as-synthesized and activated BaTATB were found to be crystalline and in pure phase, as shown in FIG. 5A. The distinct peaks at 2θ=5.86, 7.06, 9.34, and 11.48 in activated and as-synthesized BaTATB closely resembled the simulated data derived from the single-crystal XRD. The thermogravimetric analysis of BaTATB indicates an initial weight reduction of approximately 10% around 50° C.-200° C. due to the loss of the trapped and ligating water and DMF molecules, as shown in FIG. 5B. In contrast, the activated BaTATB does not show any weight loss in the region, supporting the absence of coordinated water and DMF molecules. Furthermore, the framework is stable up to 400° C. at which there is a weight loss of 37% that corresponds to the decomposition of the framework [Kaewsai, S.; Gobbo, S. D.; D'Elia, V., 2024, ChemCatChem, 16(10), e202301713, incorporated herein reference in its entirety].

Figure 4A:
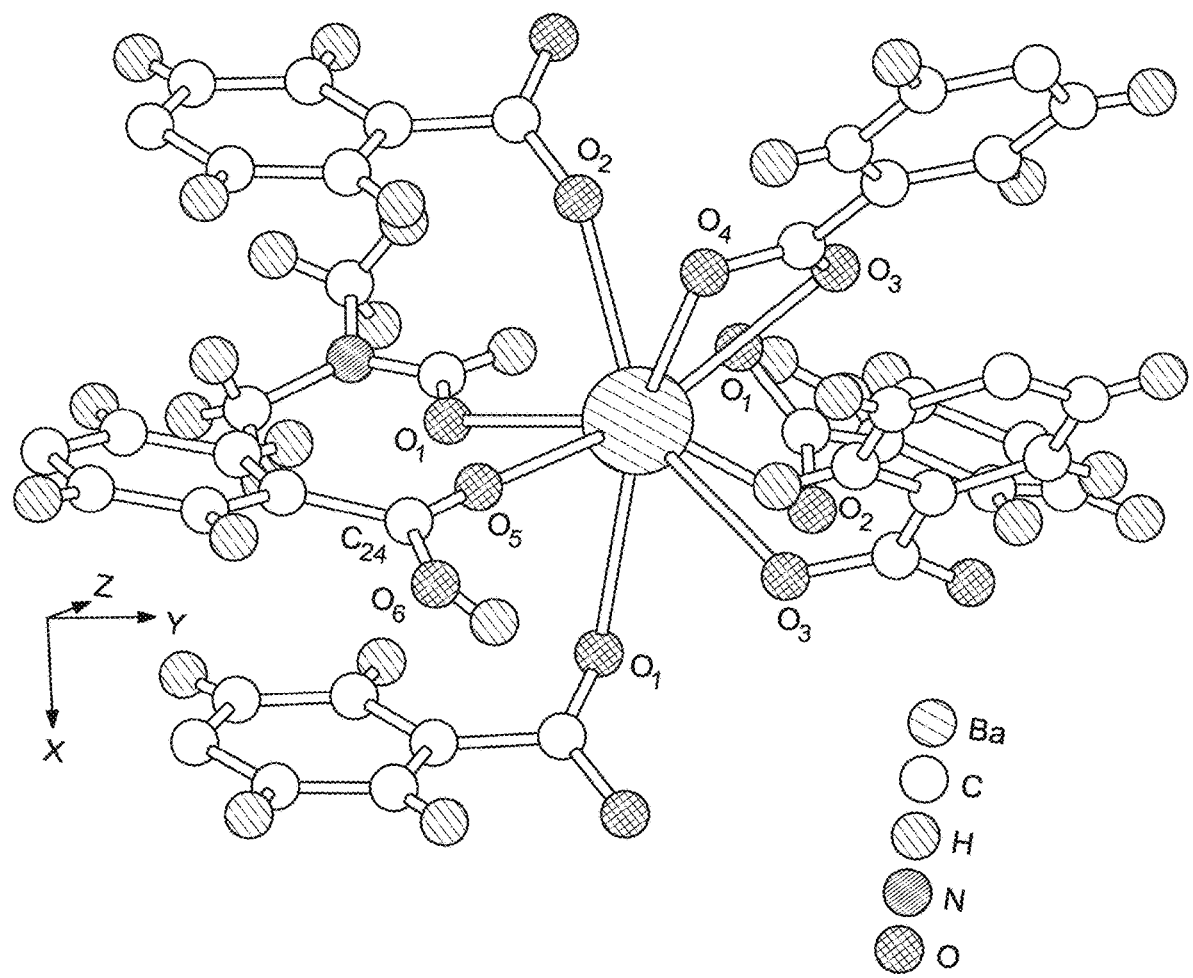
FIG. 4A illustrates barium ion with the coordination sphere, according to certain embodiments.
Figure 4B:
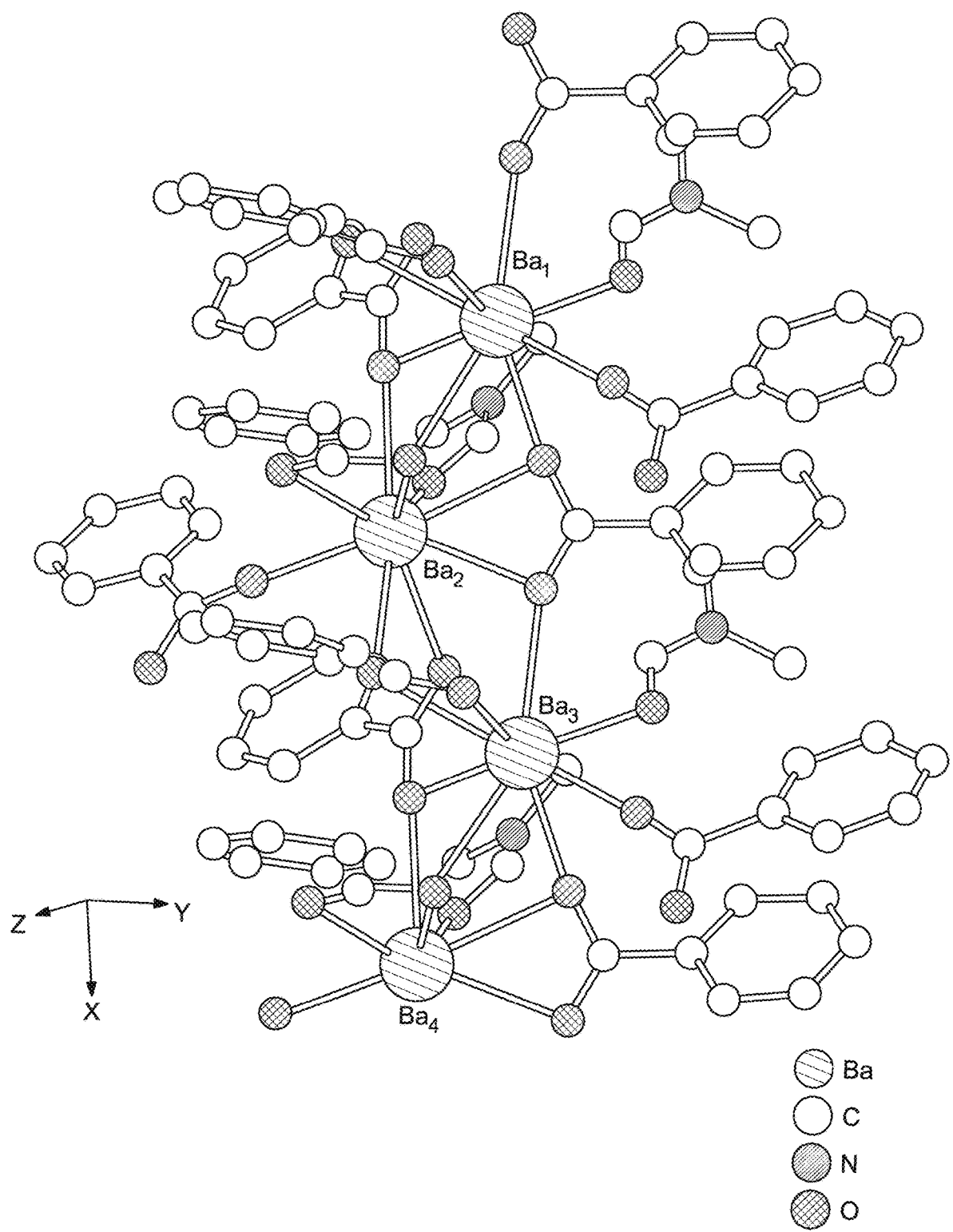
FIG. 4B illustrates views of the structure of the column of coordinated barium ions with bridging carboxylate ligands, according to certain embodiments.
Figure 4C:
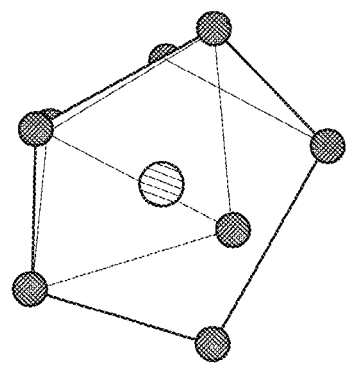
FIG. 4C illustrates [$BaO_9$] polyhedron, according to certain embodiments.
Figure 4D:
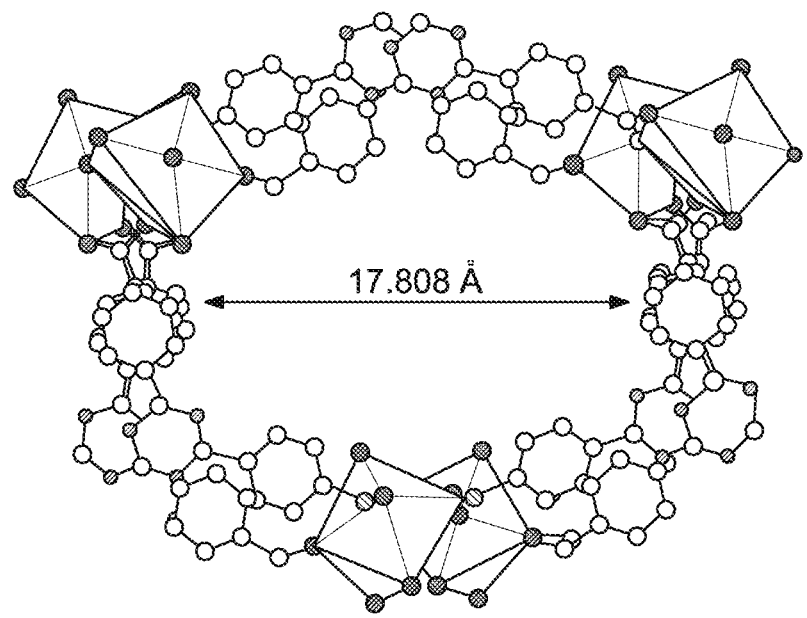
FIG. 4D illustrates pore width of the honeycomb shape architecture of the BaTATB, according to certain embodiments.
Figure 6A:
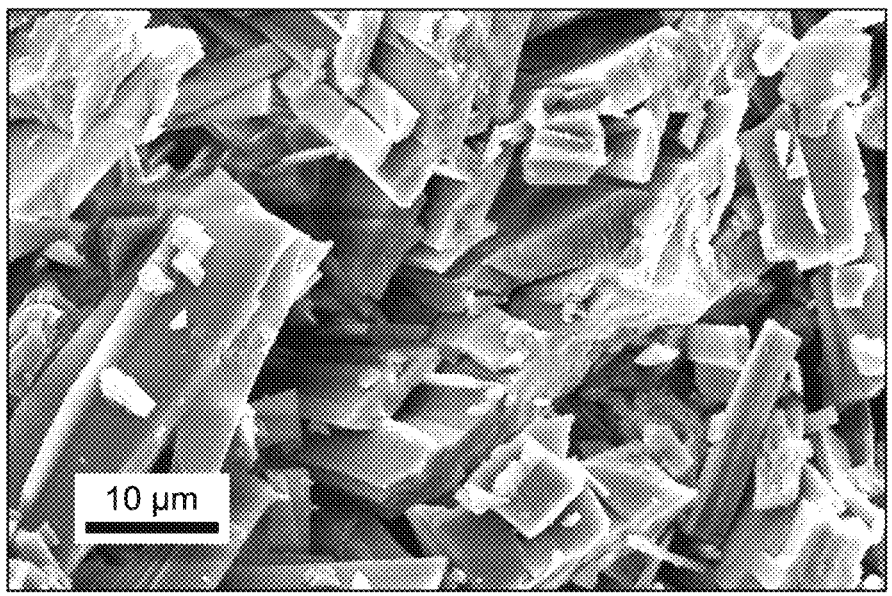
FIG. 6A depicts magnification of field emission scanning electron microscope (FESEM) micrographs at 10 μm of the BaTATB, according to certain embodiments.
Figure 6B:
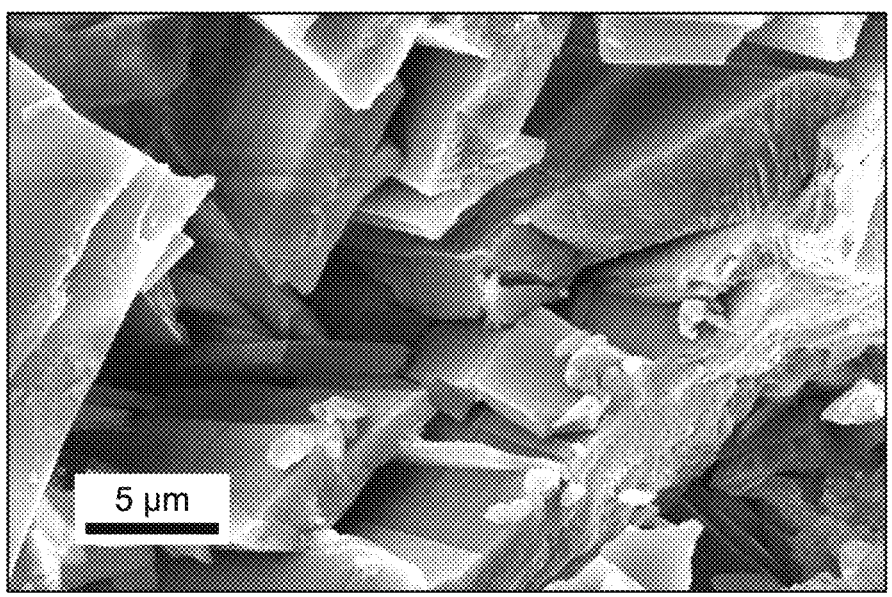
FIG. 6B depicts magnification of FESEM micrographs at 5 μm of the BaTATB, according to certain embodiments.
Figure 6C:
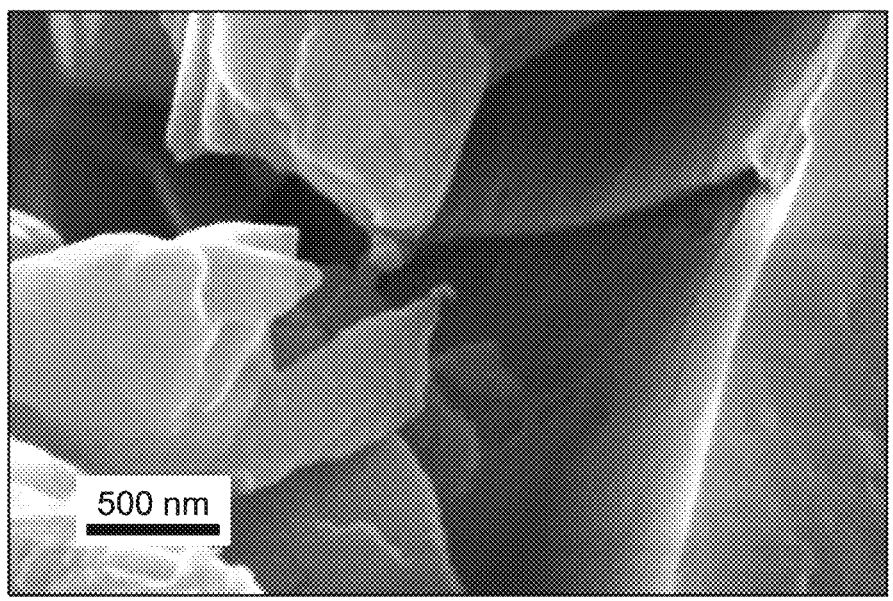
FIG. 6C depicts magnification of FESEM micrographs at 500 nanometers (nm) of the BaTATB, according to certain embodiments.
Figure 6D:
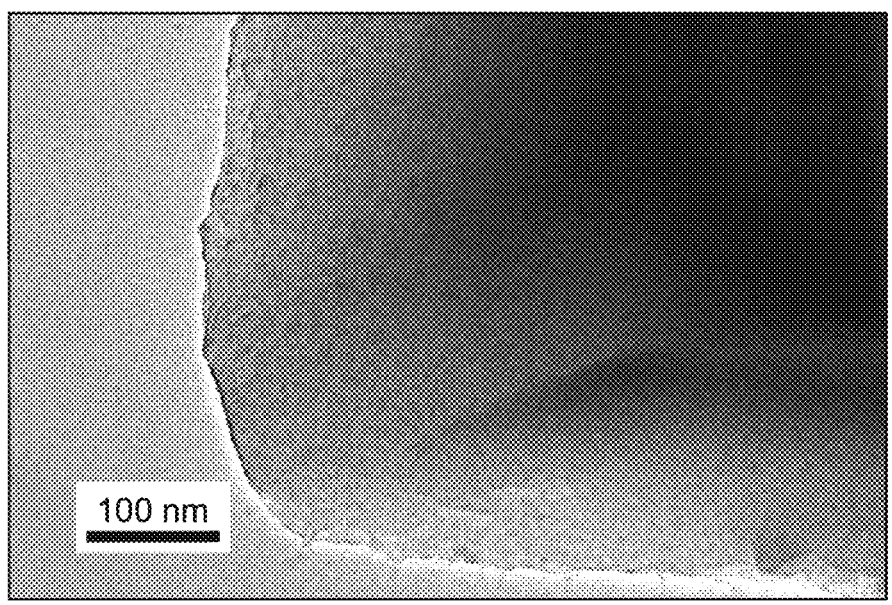
FIG. 6D depicts magnification of high-resolution transmission electron microscopy (HRTEM) micrographs at 100 nm of BaTATB, according to certain embodiments.
Figure 6E:
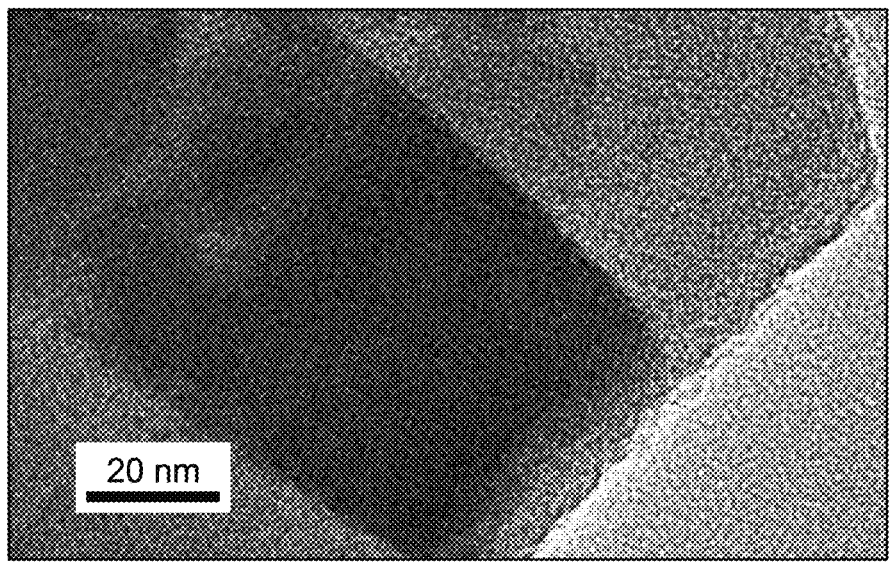
FIG. 6E depicts magnification of HRTEM micrographs at 20 nm of the BaTATB, according to certain embodiments.
Figure 6F:
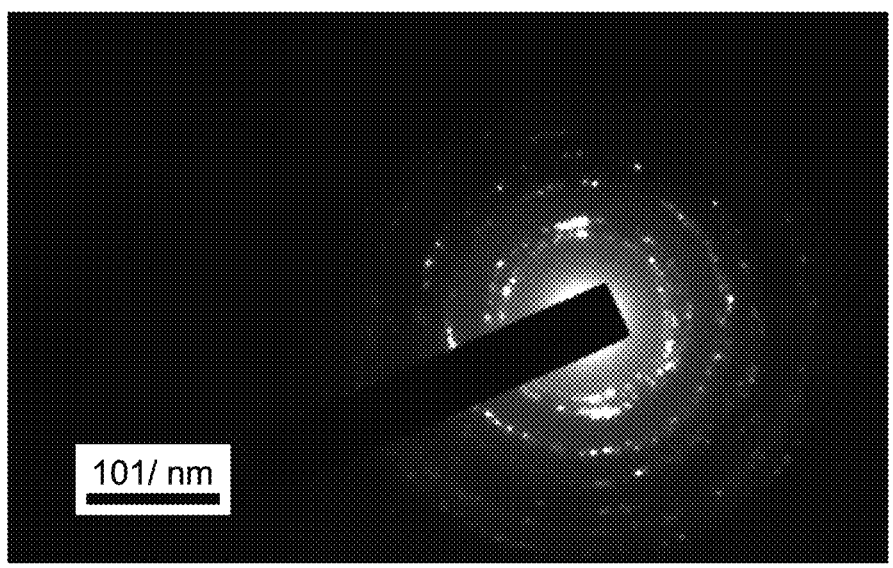
FIG. 6F depicts selected area electron diffraction (SAED) pattern confirming the crystalline nature of BaTATB, according to certain embodiments.
Figure 7A:
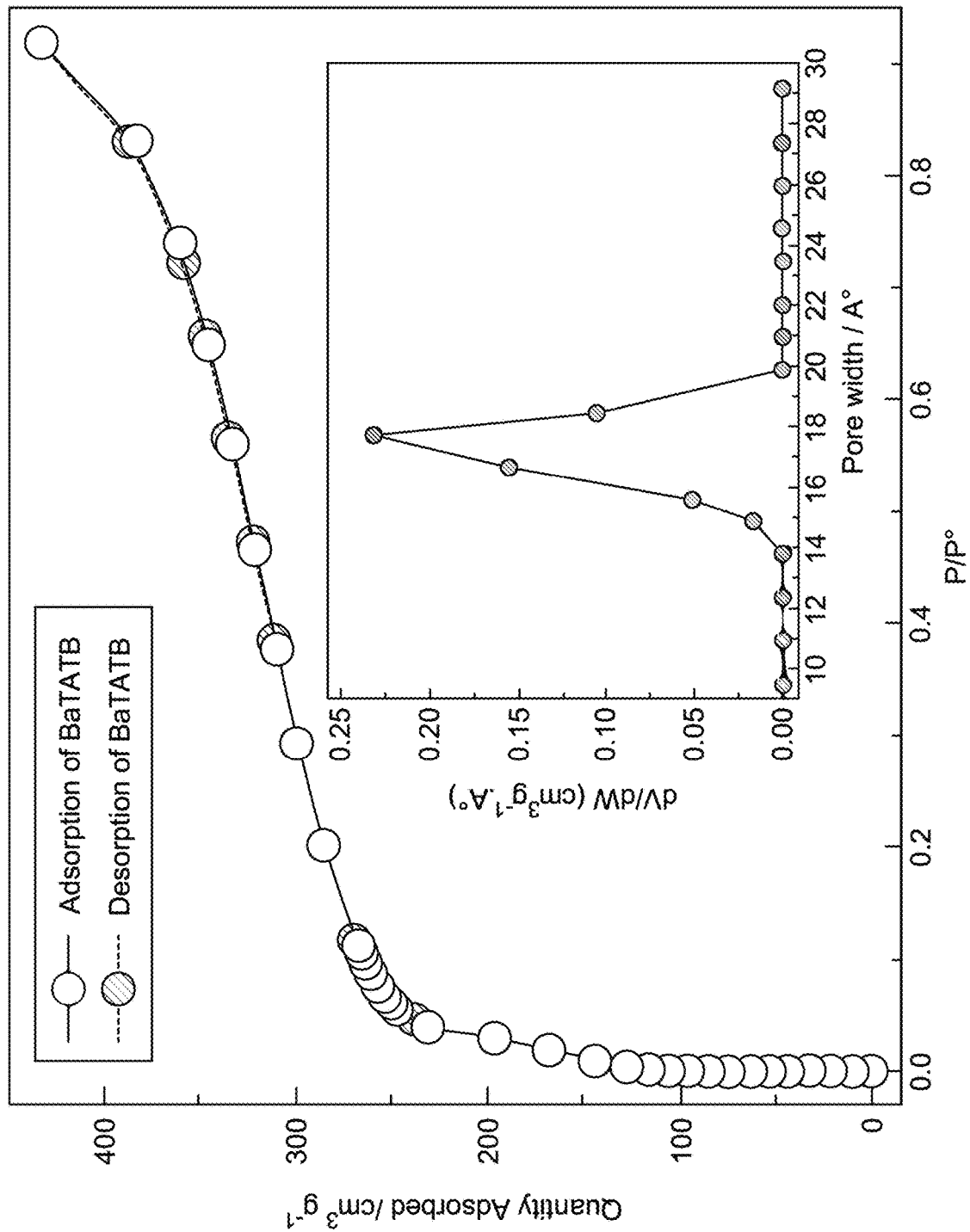
FIG. 7A depicts nitrogen ($N_2$) adsorption isotherm of BaTATB, inset pore size distribution of BaTATB, according to certain embodiments.
Figure 8:
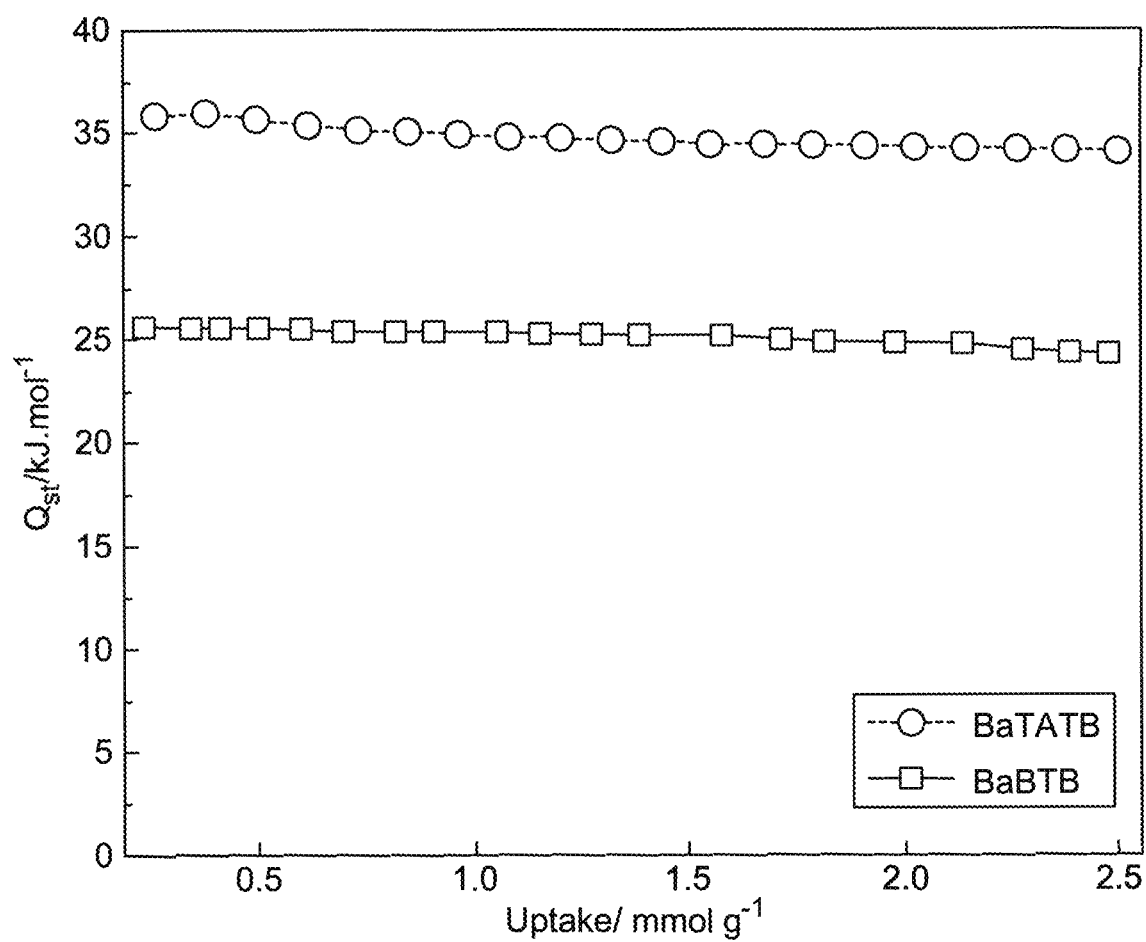
FIG. 8 depicts enthalpy of carbon dioxide adsorption for BaTATB and BaBTB using Clausius-Clapeyron equation calculations, according to certain embodiments.

The field emission scanning electron microscopy (FE-SEM) images of BaTATB effectively accentuate the distinct morphology of the structures, as shown in FIG. 6A-6C. The FESEM images depict BaTATB in its bulk state, where the particles are clearly defined, exceptionally crystalline, and have a thick rectangular sheet-like morphology. A comprehensive investigation was conducted using HRTEM, as shown in FIG. 6D-6F. The images revealed a well-dispersed particle distribution, leading to easily accessible active metal sites for catalytic reactions. FIG. 6E illustrates how the selected area electrode diffraction (SAED) pattern confirmed the crystalline character of BaTATB. As explained before, in the single crystal structure, BaTATB exhibited a three-dimensional honeycomb architecture with a pore width of 17.80 Å, as shown in FIG. 4D, which is decorated with Lewis acidic $BaO_9$ clusters and the Lewis basic triazine moiety of the TATB. To assess the permanent porosity of the framework, reversible $N_2$ sorption studies were implemented at 77K, as shown in FIG. 7A. The BaTATB were activated at 423 K under vacuum before the adsorption experiments, and the framework stability was further verified through PXRD analysis, as shown in FIG. 5A. The porous character of the frameworks was substantiated by the type-I profile of the $N_2$ adsorption isotherms with a saturated adsorption amount of 432 cubic centimeters per gram ($cm^3 \cdot g^{-1}$). The brunauer-emmett-teller (BET) surface area for the BaTATB was 1041 $m^2g^{-1}$ with a pore size of 18 Å, as shown in FIG. 7A. From the crystal structure, it was evident that the interior of the BaTATB is embellished with the Lewis basic triazine moiety of the TATB which augmented the affinity for $CO_2$. BaTATB demonstrated a characteristic type-I behavior for $CO_2$ adsorption at 273 K and 298 K, with the uptake of 5.1 millimole per gram ($mmol \cdot g^{-1}$) and 3.1 $mmol \cdot g^{-1}$ respectively under 1 bar. The adsorption heat ($Q_{st}$) of $CO_2$ in BaTATB is 36 kilojoule per mole ($kJ \cdot mol^{-1}$) calculated from the Clausius-Clapeyron equation, as depicted in FIG. 8, showing a significant interaction between the adsorbate and adsorbent. Furthermore, grand canonical Monte Carlo (GCMC) was used to calculate the adsorption of $CO_2$ at pressures ranging from 0 bar to 1 bar and at temperatures 273 K and 298 K for the whole unit cell of the BaTATB framework, as shown in Tables 3 and 4.

TABLE 3

| Crystal data and structure refinement for BaTATB | |
| --- | --- |
| Empirical formula | $C_{51} H_{39} Ba_2 N_7 O_{16}$ |
| Formula weight | 1280.57 |
| Temperature | 307(2) K |
| Wavelength | 0.71073 Å |
| Crystal system | Orthorhombic |
| Space group | $Pna2_1$ |
| Unit cell dimensions | a = 7.2925(2) Å |
| | b = 18.6823(4) Å |
| | c = 25.1482(6) Å |
| Volume | 3426.21(14) Å3 |
| Z | 2 |
| Density (calculated) | 1.241 g/cm3 |
| Absorption coefficient | 1.201 mm-1 |
| F(000) | 1268 |
| Theta range for data collection | 2.663 to 34.395° |
| Index ranges | −11 ≤ h ≤ 11, −29 ≤ k ≤ 29, −39 ≤ l ≤ 39 |
| Reflections collected | 120925 |
| Independent reflections | 14376 [R(int) = 0.0709] |
| Completeness to theta = 25.242° | 99.80% |
| Absorption correction | Semi-empirical from equivalents |
| Max. and min. transmission | 0.965 and 0.837 |
| Refinement method | Full-matrix least-squares on F2 |
| Data/restraints/parameters | 14376/7/342 |
| Goodness-of-fit on F2 | 1.053 |
| Final R indices [I > 2sigma(I)] | R1 = 0.0452, wR2 = 0.0991 |
| R indices (all data) | R1 = 0.0764, wR2 = 0.1070 |
| Largest diff. peak and hole | 0.974 and −2.148 e · Å−3 |
| Ba(1)-O(5)#1 | 2.720 (4) |
| Ba(1)-O(2)#2 | 2.760 (3) |
| Ba(1)-O(8) | 2.782 (6) |
| Ba(1)-O(2)#3 | 2.809 (3) |
| Ba(1)-O(4)#4 | 2.818 (4) |

TABLE 3-continued

| Crystal data and structure refinement for BaTATB | |
| --- | --- |
| Ba(1)-O(1)#3 | 2.824 (4) |
| Ba(1)-O(1) | 2.851 (4) |
| Ba(1)-O(3)#5 | 2.863 (4) |
| Ba(1)-O(3)#4 | 2.923 (3) |
| O(5)#1-Ba(1)-O(2)#2 | 104.48 (12) |
| O(5)#1-Ba(1)-O(8) | 83.8 (2) |
| O(2)#2-Ba(1)-O(8) | 71.17 (16) |
| O(5)#1-Ba(1)-O(2)#3 | 141.88 (12) |
| O(2)#2-Ba(1)-O(2)#3 | 112.92 (9) |
| O(8)-Ba(1)-O(2)#3 | 101.1 (2) |
| O(5)#1-Ba(1)-O(4)#4 | 81.55 (12) |
| O(2)#2-Ba(1)-O(4)#4 | 68.64 (11) |
| O(8)-Ba(1)-O(4)#4 | 131.77 (19) |
| O(2)#3-Ba(1)-O(4)#4 | 118.33 (11) |
| O(5)#1-Ba(1)-O(1)#3 | 162.27 (13) |
| O(2)#2-Ba(1)-O(1)#3 | 68.06 (10) |
| O(8)-Ba(1)-O(1)#3 | 78.6 (2) |
| O(2)#3-Ba(1)-O(1)#3 | 45.80 (10) |
| O(4)#4-Ba(1)-O(1)#3 | 108.96 (12) |
| O(5)#1-Ba(1)-O(1) | 78.67 (12) |
| O(2)#2-Ba(1)-O(1) | 143.81 (12) |
| O(8)-Ba(1)-O(1) | 73.43 (17) |
| O(2)#3-Ba(1)-O(1) | 67.01 (10) |
| O(4)#4-Ba(1)-O(1) | 145.66 (12) |
| O(1)#3-Ba(1)-O(1) | 97.88 (13) |
| O(5)#1-Ba(1)-O(3)#5 | 83.30 (12) |
| O(2)#2-Ba(1)-O(3)#5 | 147.96 (11) |
| O(8)-Ba(1)-O(3)#5 | 140.86 (16) |
| O(2)#3-Ba(1)-O(3)#5 | 69.08 (10) |
| O(4)#4-Ba(1)-O(3)#5 | 82.22 (11) |
| O(1)#3-Ba(1)-O(3)#5 | 111.75 (10) |
| O(1)-Ba(1)-O(3)#5 | 67.86 (12) |
| O(5)#1-Ba(1)-O(3)#4 | 126.27 (12) |
| O(2)#2-Ba(1)-O(3)#4 | 68.87 (10) |
| O(8)-Ba(1)-O(3)#4 | 134.69 (17) |
| O(2)#3-Ba(1)-O(3)#4 | 76.17 (11) |
| O(4)#4-Ba(1)-O(3)#4 | 45.50 (11) |
| O(1)#3-Ba(1)-O(3)#4 | 67.39 (12) |
| O(1)-Ba(1)-O(3)#4 | 138.26 (10) |
| O(3)#5-Ba(1)-O(3)#4 | 81.39 (8) |

Figure 7B:
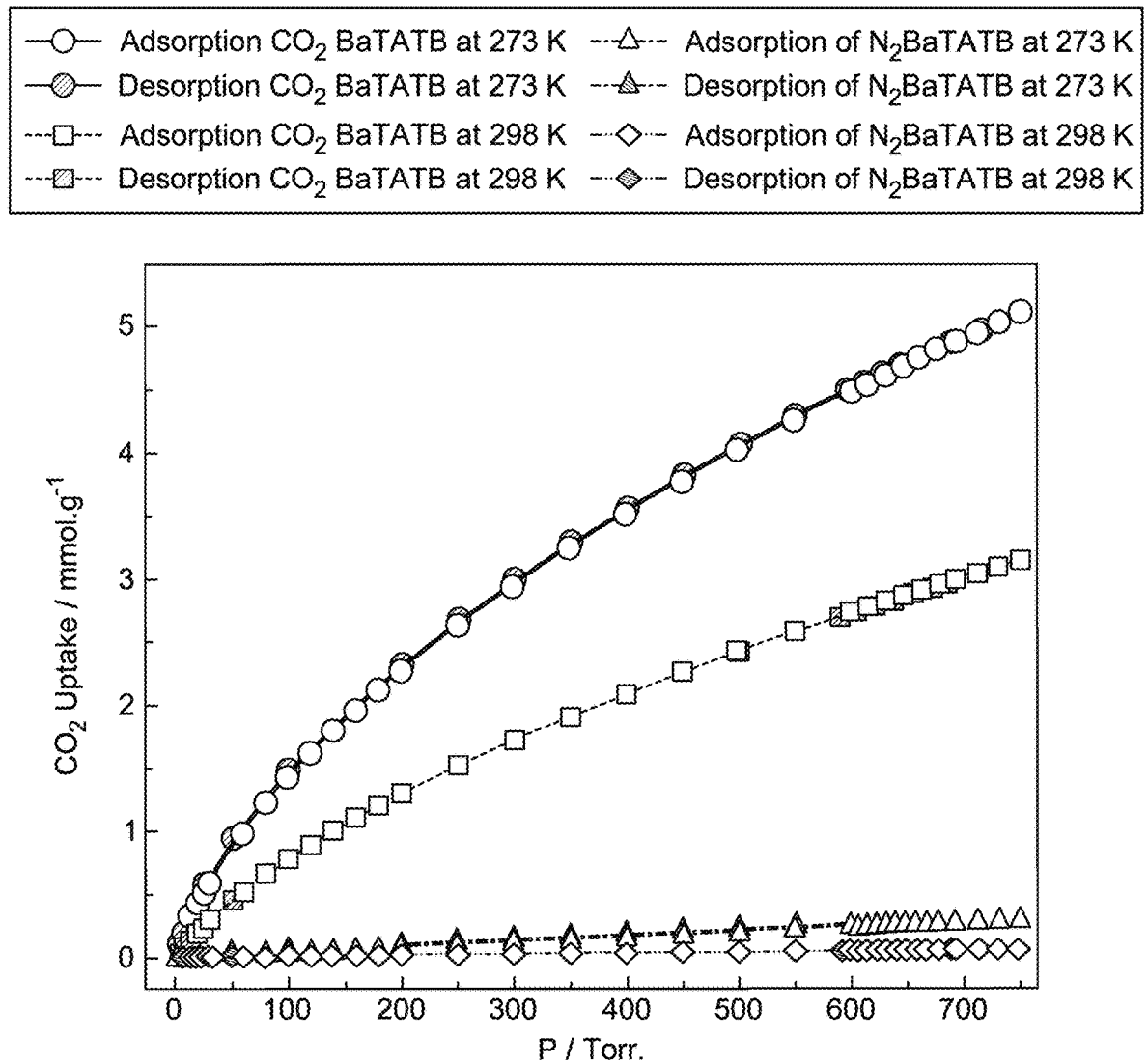
FIG. 7B depicts selective adsorption-desorption isotherm of BaTATB for $CO_2$ and $N_2$ at 273 K and 298 K, according to certain embodiments.
Figure 9A:
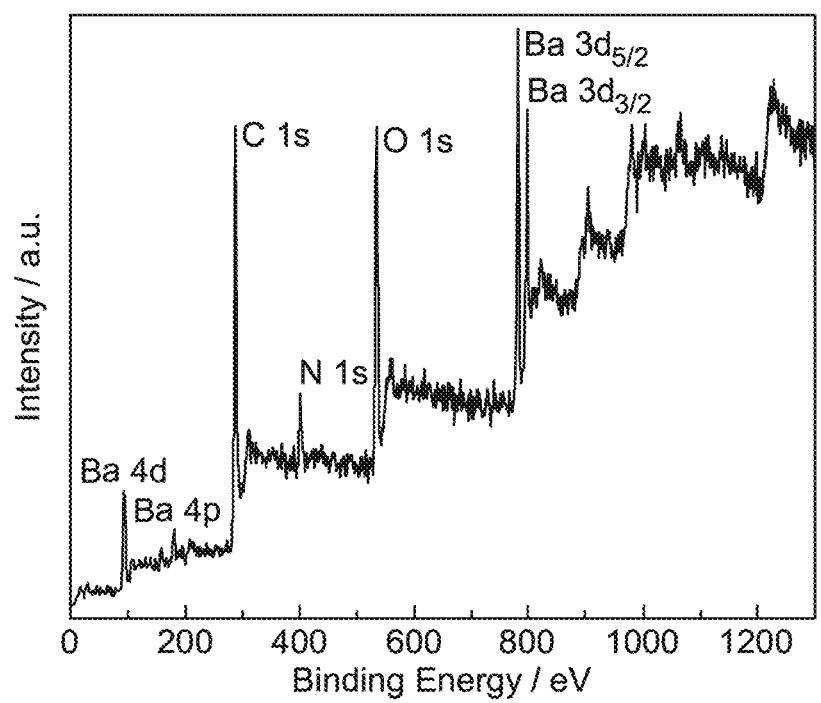
FIG. 9A depicts X-ray photoelectron spectroscopy (XPS) survey spectrum of BaTATB, according to certain embodiments.
Figure 9B:
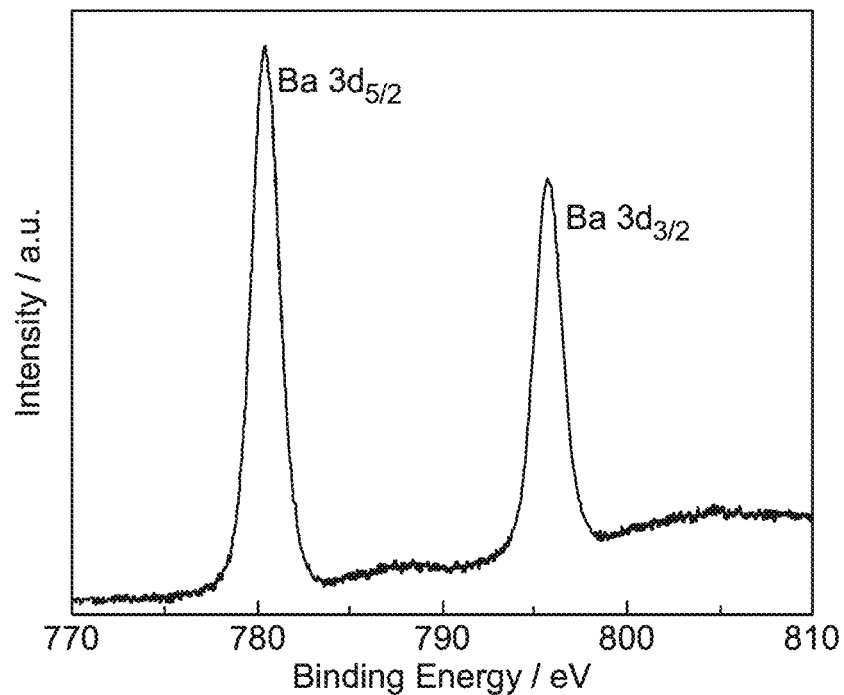
FIG. 9B depicts high-resolution XPS spectra of Ba 3d, according to certain embodiments.
Figure 10A:
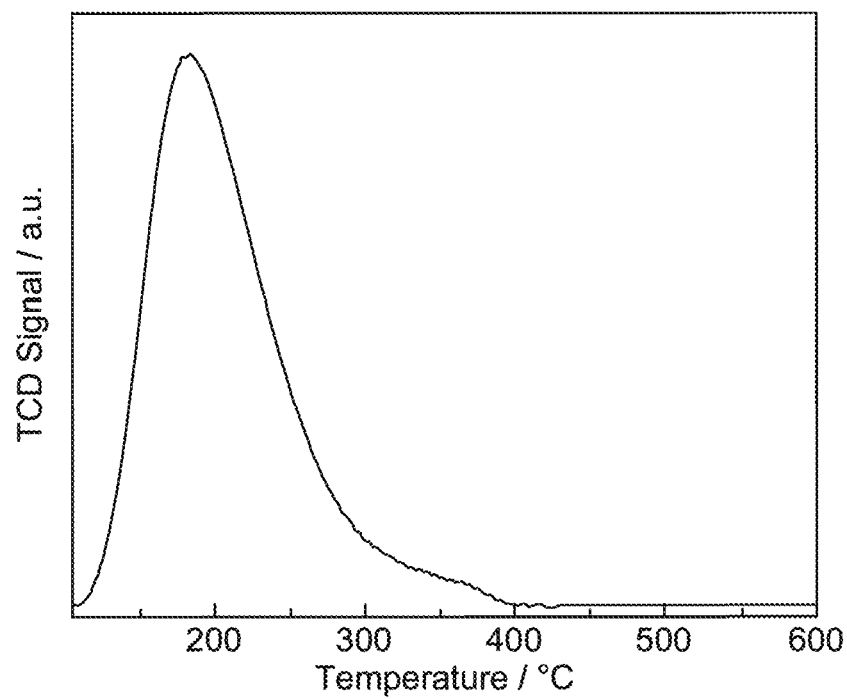
FIG. 10A depicts ammonia-temperature-programmed desorption ($NH_3$-TPD) of BaTATB, according to certain embodiments.
Figure 10B:
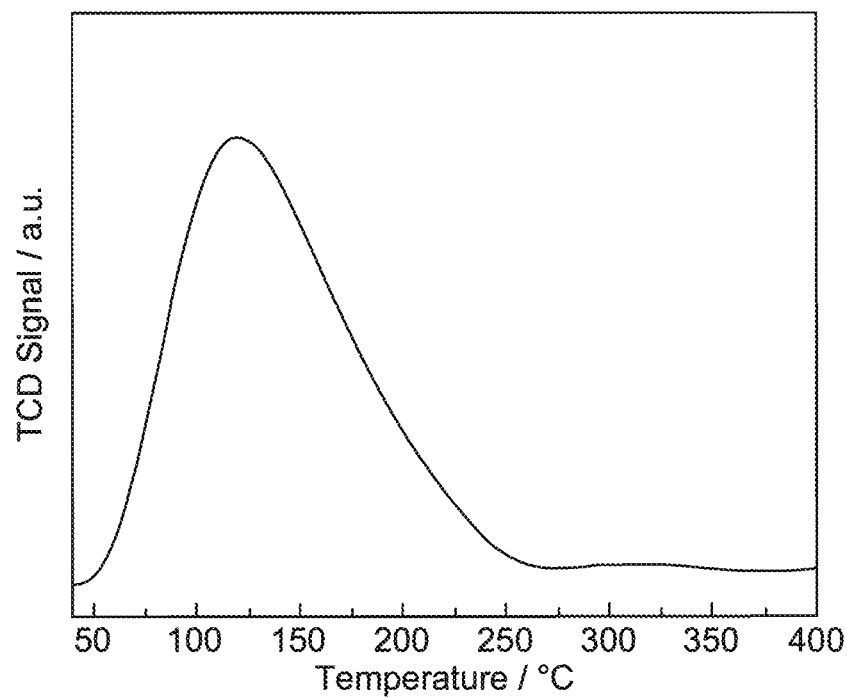
FIG. 10B depicts carbon dioxide-temperature-programmed desorption ($CO_2$-TPD) of BaTATB, according to certain embodiments.

Symmetry transformations used to generate equivalent atoms:
1 x+1/2,−y+3/2,z #2 x+1,y,z #3 x+1/2,−y+1/2,z #4 −x+5/2,y−1/2,z+1/2 #5 −x+2,−y+1,z+1/2 #6 x−1/2,−y+1/2,z #7 x−1,y,z #8 −x+2,−y+1,z−1/2 #9 −x+5/2,y+1/2,z−1/2 #10 x−1/2,−y+3/2,z Table 4: Selected Bond Lengths [Å] and Bond Angles [°] for BaTATB It was observed that initially there was a deviation from the experimental results at low pressure; then, it started to become consistent with the experimental observations, especially at low temperatures. Moreover, due to the high affinity for $CO_2$, BaTATB exhibited negligible uptake of 0.31 $mmol \cdot g^{-1}$ and 0.05 $mmol \cdot g^{-1}$ at 273 K and 298 K for $N_2$, as shown in FIG. 7B. The $CO_2$ selectivity constants over $N_2$ have been determined in accordance with Henry's Law [Ding, M.; Jiang, H. L., 2018, *ACS Catalysis*, 8, 3194-3201, incorporated herein by reference in its entirety], and the estimated $CO_2/N_2$ value was calculated to be 48.5 The significantly elevated separation constants of $CO_2$ compared to N2 indicates the potential usefulness of BaTATB in separating $CO_2$ from industrial effluent gases and flue gas. A comprehensive view of the elemental composition is provided by the XPS survey spectrum in FIG. 9A. The presence of peaks corresponding to C 1s, N 1s, O 1s, and Ba $3d_{5/2}$ Ba $3d_{3/2}$ at binding energies of approximately 287 eV, 403 eV, 533 eV, 782 eV, and 798 eV respectively are consistent with the electronic environment of the elements in the framework. The high-resolution XPS spectrum of Ba 3d exhibits two separate peaks, indicative of the spin-orbit coupling in the electronic configuration of Ba, as shown in FIG. 9B. The measured binding energies of around 782 eV for Ba $3d_{5/2}$ and 798 eV for Ba $3d_{3/2}$ indicate that Ba is in a divalent state, commonly observed for Ba in a stable MOF environment. The primary purpose of the temperature-programmed desorption (TPD) method is to measure acidic and basic sites in the MOF. $NH_3$-TPD of BaTATB exhibits a strong adsorption peak at 182° C., indicating the presence of weak and medium acidic sites [20 micromole per gram ($\mu mol \cdot g^{-1}$)] due to the BaO clusters in the MOF, as shown in FIG. 10A. Similarly, the $CO_2$-TPD of BaTATB displays a peak at 120° C., which indicates the existence of both weak and medium basic sites ($\mu mol \cdot g^{-1}$, Table 3) from the triazine moiety of the organic linker, as shown in FIG. 10B and Table 5.

catalyst loading of 45 mg, a reaction temperature of 70° C., and a reaction duration of 8 hours and 1 bar of $CO_2$, as shown in Table 6. Isoreticular BaMOF without a triazine ring (BaBTB) was synthesized to study the effect of the triazine ring in the catalysis [Helal, A.; et al., 2020, *Inorganic Chemistry Frontiers*, 7, 3571-3577, incorporated herein reference in its entirety]. It was determined that BaBTB, when used as a catalyst under analog conditions, results in a mere 18% conversion of epoxides to cyclic carbonates. Furthermore, the epoxide cyclization reaction was carried out under similar reaction conditions without the use of MOF, in the presence of $Ba(NO_3)$, and with the pristine linker. In all cases, it results in very low or negligible conversion to cyclic carbonates. This concludes the impor-

TABLE 5

| | Characteristic properties of BaTATB | | | | | | |
|---|---|---|---|---|---|---|---|
| | Surface Area (BET) | Pore Width | $CO_2$ uptake (mmol · g$^{-1}$) 273K | $CO_2$/ $N_2$ at 273K | $Q_{st}$ (kJ · mol$^{-1}$) | Acidic sites (mmol · g$^{-1}$) | Basic sites (mmol · g$^{-1}$) |
| | | | | 298K | | | |
| BaTATB | 1041 m$^2$g$^{-1}$ | 18 Å | 5.1 | 3.1 | 48.5 | 36 | 20 | 97 |

Example 10: Catalysis

Figure 11A:
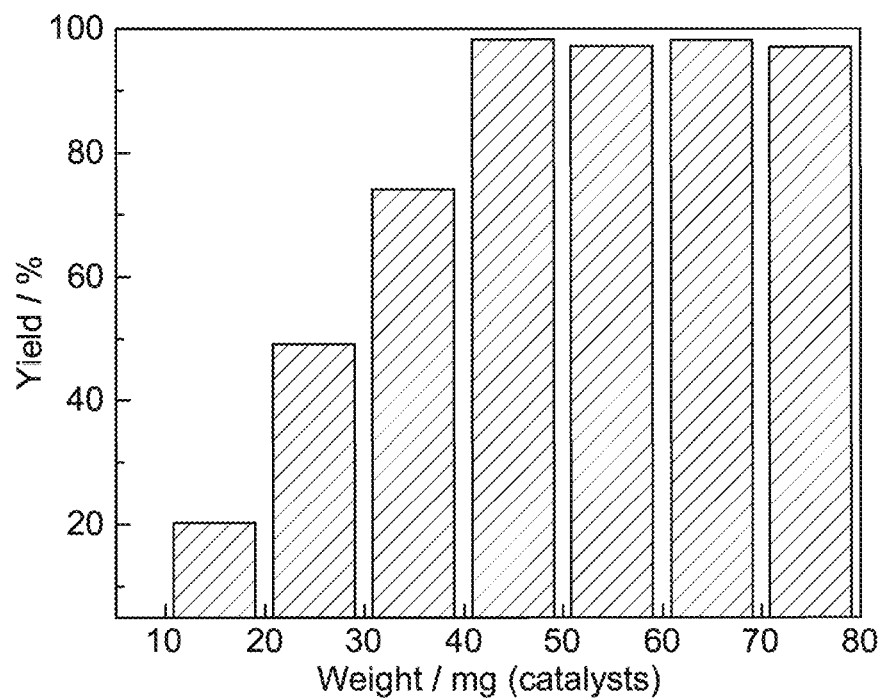
FIG. 11A depicts the effect of reaction parameters for BaTATB on the cycloaddition of SO and $CO_2$: catalyst amount (70° C., 8 h), according to certain embodiments.
Figure 11B:
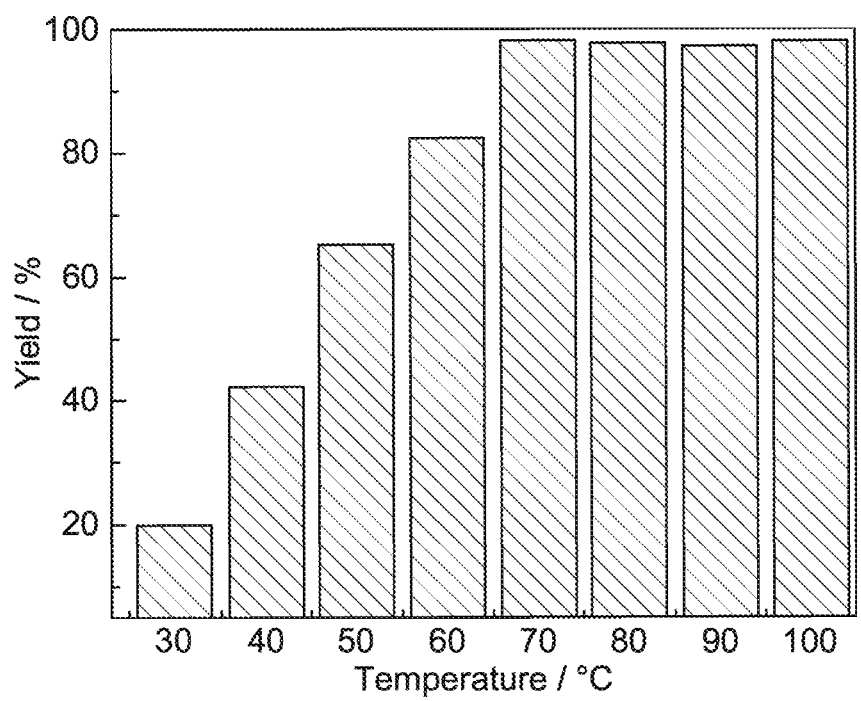
FIG. 11B depicts effect of reaction parameters for BaTATB on the cycloaddition of SO and $CO_2$. reaction temperature (45 mg catalyst, 8 h), according to certain embodiments.
Figure 11C:
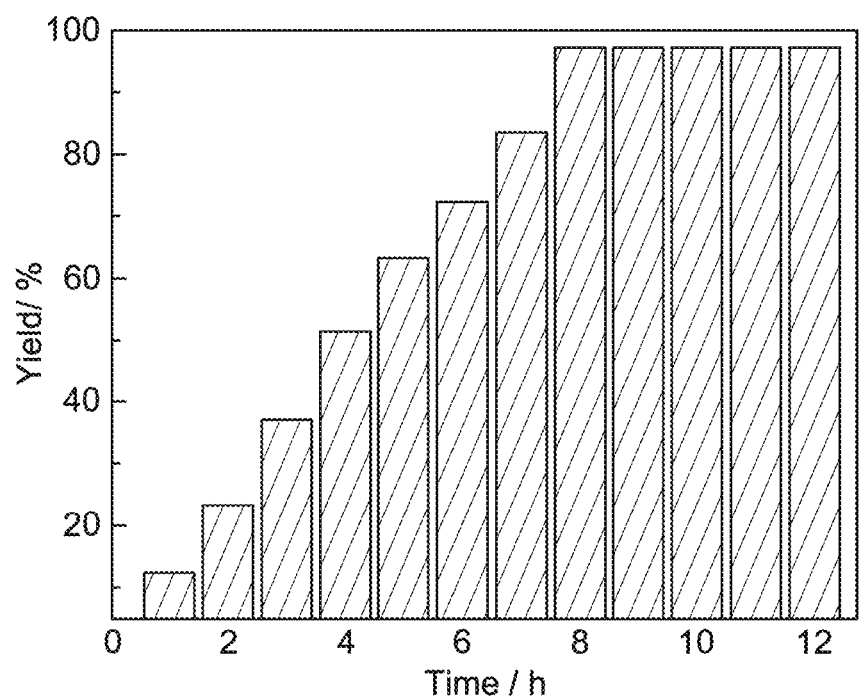
FIG. 11C depicts effect of reaction parameters for BaTATB on the cycloaddition of SO and $CO_2$ reaction time (45 mg catalyst, 70° C.), according to certain embodiments.

The structures of BaTATB exhibited highly porous cages with a dimension of approximately 17.8 Å. The interior walls of the pores are adorned with Lewis acidic BaO clusters of the inorganic secondary building unit (SBU) and the Lewis basic triazine moieties of the organic struts. These characteristics make the BaTATB ideal materials for catalyzing two-component reactions under ambient pressure and cocatalyst-free and solvent-free conditions for $CO_2$ fixation. The first reaction studied with BaTATB as a catalyst was the two-component cycloaddition of $CO_2$ to epoxides. The MOF was activated at 423 K under vacuum for 12 h to generate the framework with unsaturated Lewis acidic Barium clusters of BaTATB. Furthermore, the activated BaTATB was first tested for the cocatalyst-free and solvent-free cycloaddition of $CO_2$ with epoxides to evaluate the reaction conditions, with styrene oxide (SO) serving as the model substrate. Additionally, an investigation was conducted to determine the significance of reaction parameters on the cycloaddition reaction to generate SO carbonate. The catalyst loading, as shown in FIG. 11A, temperature, as shown in FIG. 11B, and reaction time, as shown in FIG. 11C indicated that the maximum conversion of SO (98%) to its corresponding cyclic carbonates may be achieved with a tance of the BaTATB in its entirety in the conversion of epoxides to cyclic carbonates under ambient pressure, cocatalysts free, and solvent-free condition. The versatility of the catalyst was assessed by assessing its efficacy in the cycloaddition reaction of a variety of aliphatic and aromatic epoxides. The analysis of Table 4 reveals that the catalysts effectively transform all carbonates at a reaction temperature of 70° C., and a reaction time of 8 hours. The reactions occur at a temperature of 70° C., and for a duration of 8 hours with yield from 85% to 98%. The porous structure and substantial surface area of BaTATB facilitate the facile penetration of small-size linear epoxides (such as 1,2-epoxypropane, 1,2-epoxybutane, 1,2-epoxyhexane, allyl glycidyl ether, and epichlorohydrin) and bulky aromatic epoxides (styrene oxide and phenylglycidyl ether), as shown in Table 4, through the MOF framework without encountering any steric hindrance and readily access the active sites (Lewis acid sites) of the catalyst. However, the yield is significantly reduced for cyclohexene oxide because of its bulky disubstituted structure, which obstructs the access of the substrate to the active site of the catalyst. The yield and selectivity of cyclic carbonates from each cycloaddition reaction were assessed using $^1H$ NMR and $^{13}C$ NMR of the isolated products.

TABLE 6

| Various cyclic carbonates syntheses using the BaTATB catalysts | | | | |
|---|---|---|---|---|
| Entry | R | Products | A | Yield$^a$ (%) |
| 1 | —$CH_3$ | 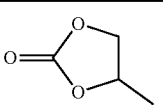 | A1 | 92 |
| 2 | —$CH_2CH_3$ | 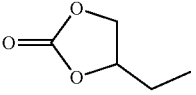 | A2 | 95 |

TABLE 6-continued

Various cyclic carbonates syntheses using the BaTATB catalysts

| Entry | R | Products | A | Yield$^a$ (%) |
|---|---|---|---|---|
| 3 | —CH$_2$CH$_2$CH$_2$CH$_3$ | [structure] | A3 | 97 |
| 4 | [cyclohexene] | [structure] | A4 | 51 |
| 5 | —CH$_2$Cl | [structure with Br] | A5 | 93 |
| 6 | [allyl ether structure] | [structure] | A6 | 85 |
| 7 | [phenyl structure] | [structure] | A7 | 98 |
| 8 | [phenoxy structure] | [structure] | A8 | 95 |

Figure 12:
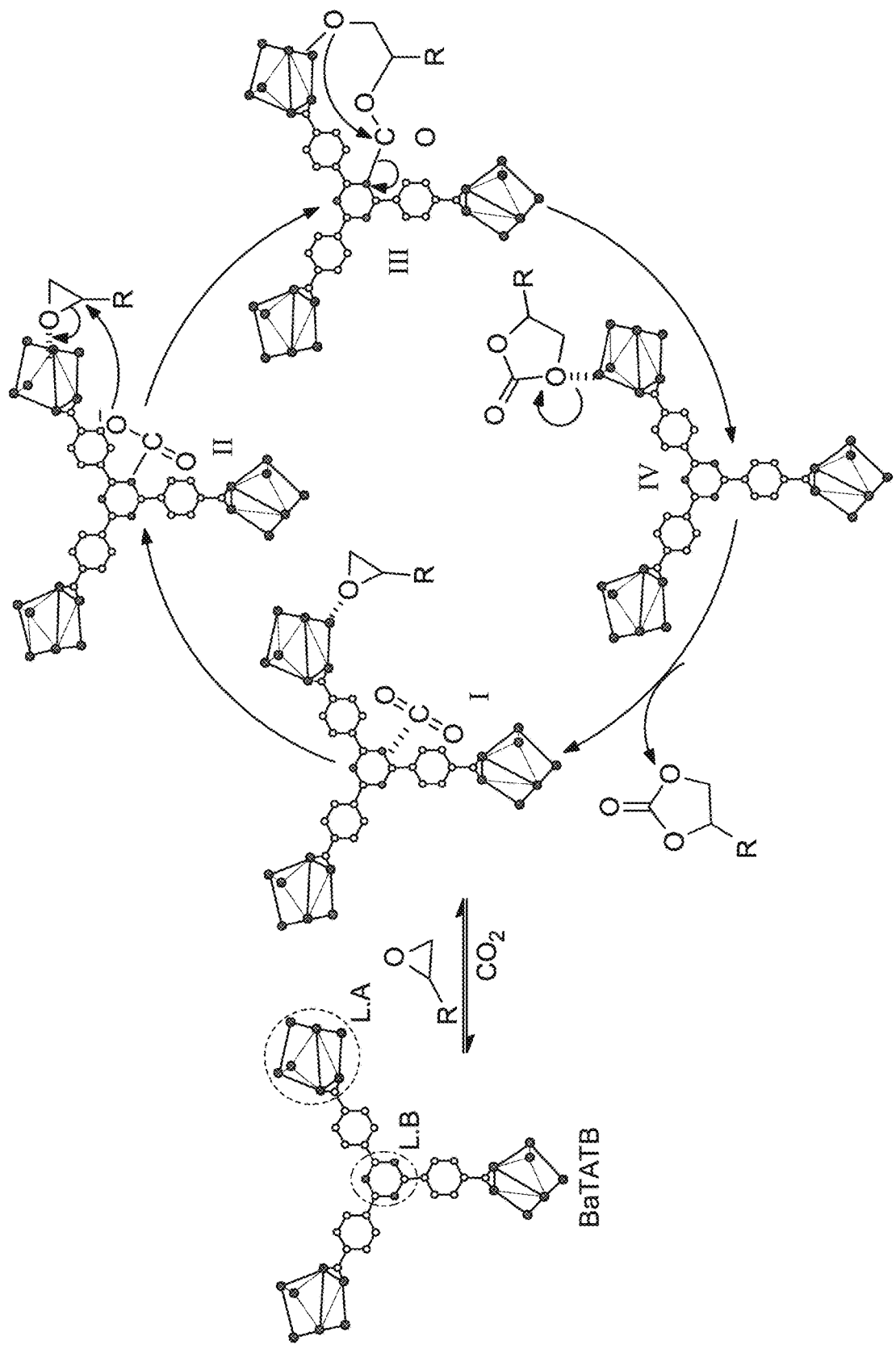
FIG. 12 depicts a schematic representation of a proposed mechanism of forming the cyclic carbonate from the epoxide by BaTATB, according to certain embodiments.
Figure 13:
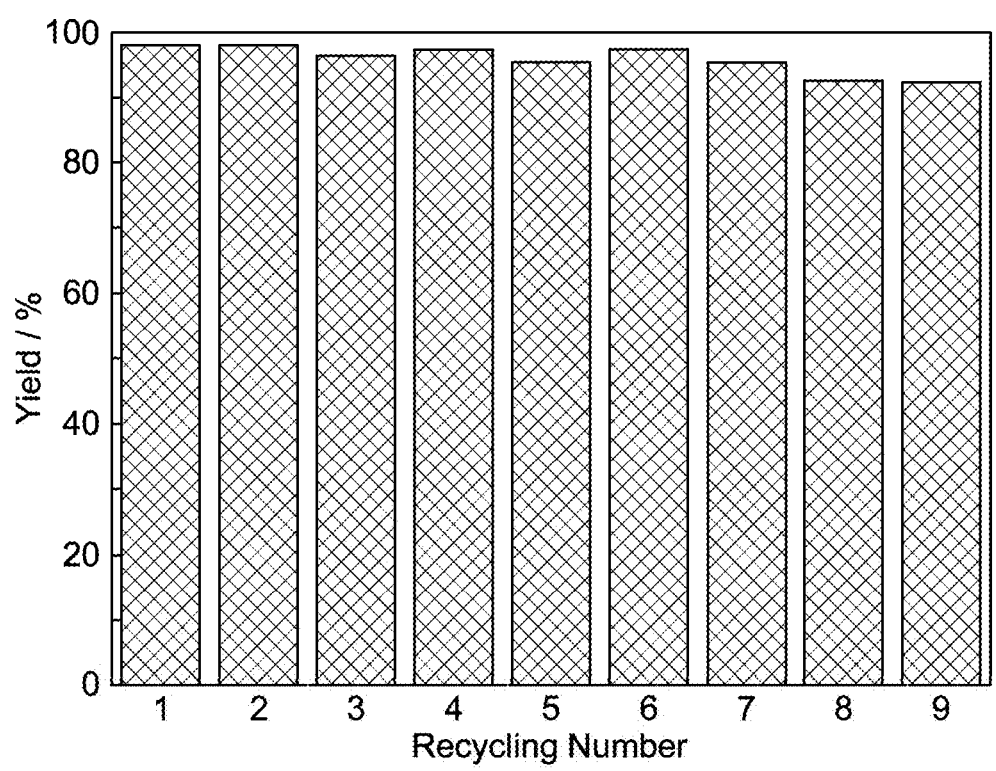
FIG. 13 depicts a recycle test with BaTATB for the reaction of $CO_2$ with SO to form cyclic carbonates, according to certain embodiments.

From a mechanistic viewpoint, it was observed that the BaTATB, containing high-density Lewis acidic BaO clusters and Lewis basic triazine moieties, operate as active sites for the cycloaddition reaction, as shown in FIG. 12. The reaction is initiated by the coordination of the epoxide to the activated Ba(II) center, which is followed by the polarization of CO$_2$ at the basic triazine moieties (adduct I). This process results in the formation of carbamate species, which function as a nucleophile and aid in the ring opening of the epoxide, which is coordinated to the metal center adjacent to it (adduct II). This is succeeded by a ring-closure reaction by an intramolecular nucleophilic attack of the oxyanion with CO$_2$ that leads to the formation of the cyclic carbonate (adduct III). Ultimately, reductive elimination of the cyclic carbonates separates it from the Lewis acid while the catalyst is regenerated (adduct IV). This mechanism and the role of triazine as a cocatalyst are explained in detail in the computational study. The industrial applicability of a heterogeneous catalyst is significantly influenced by its recyclability. BaTATB was applied separately to the two-component model reactions, from which, upon completion of the first reaction, the catalyst was easily separated by centrifugation, washed with methanol three times, and reactivated by vacuum drying at 393 K. The catalyst BaTATB was then reused in nine consecutive reactions for two-component reactions following the same process. In both cases, it demonstrated exceptional conversion performance for a maximum of nine cycles without causing any adverse effects on the catalyst's structural framework or connectivity, as shown in FIG. 13. In conclusion, Ba-MOF (BaTATB) has been rationally designed and comprises high-density Lew-is's acid metal ions and basic groups. The BaTATB shows selective storage of CO$_2$ with a high Q$_{st}$ value of 36 kJ·mol$^{-1}$, CO$_2$/N$_2$ selectivity of 48.5, with CO$_2$ uptake of 5.1 mmol·g$^{-1}$. Due to the high concentration of Lewis acidic Ba(II) metal sites and basic nitrogen-rich triazine moieties, BaTATB serves as effective, environmentally friendly, recyclable catalysts for the cycloaddition of epoxides and CO$_2$ at 1 bar of CO$_2$ and moderate temperature, facilitating the efficient synthesis of cyclic carbonates without a co-catalyst and under solvent-free condition. Moreover, the active sites of the catalysts are proposed to work synergistically and are effective for a wide range of epoxides (for cyclic carbonates) substrate over multiple cycles with negligible loss in catalytic activity.

Numerous modifications and variations of the present disclosure are possible in light of the above teachings. It is therefore to be understood that within the scope of the appended claims, the invention may be practiced otherwise than as specifically described herein.

The invention claimed is:
1. A recyclable catalyst for carbon dioxide capture, comprising:
a porous metal-organic crystallite, wherein the porous metal-organic crystallite comprises a porous complex of Ba ions and units of 4,4′,4″-s-triazine-2,4,6-triyl-tribenzoic acid;
wherein walls of the pores of the porous metal-organic crystallite have a molecular honeycomb pattern formed by the porous complex, and wherein the pores of the molecular honeycomb pattern have an average pore width of 17 to 19 Å and barium clusters active metal sites.

2. The recyclable catalyst of claim 1, wherein the recyclable catalyst has a BET surface area of 1000 to 1100 $m^2g^{-1}$.

3. The recyclable catalyst of claim 1, wherein the recyclable catalyst has a $CO_2$ adsorption rate of 3 to 6 $mmolg^{-1}$ at a temperature of 0 to 25° C.

4. The recyclable catalyst of claim 1, wherein the recyclable catalyst has a $N_2$ adsorption rate of 0.03 to 0.5 $mmolg^{-1}$ at a temperature of 0 to 25° C.

5. The recyclable catalyst of claim 1, wherein the recyclable catalyst has a $CO_2$ adsorption heat of 30 to 40 $kJmol^{-1}$.

6. The method of claim 5, wherein the ionic barium compound is at least one selected from the group consisting of barium nitrate ($Ba(NO_3)_2$), barium chloride ($BaCl_2$), barium sulfate ($BaSO_4$), barium carbonate ($BaCO_3$), barium oxide (BaO), and barium chromate ($BaCrO_4$).

7. A method of synthesizing the recyclable catalyst of claim 1, comprising:
dissolving an ionic barium compound and 4,4',4"-s-triazine-2,4,6-triyl-tribenzoic acid in an aqueous solution comprising an organic solvent to form a reaction mixture; and
heating the reaction mixture to at least 100° C., then cooling to obtain an orthorhombic crystal with $BaO_9$ clusters.

8. A method of cycloaddition of carbon dioxide without a co-catalyst, comprising:
reacting an epoxide and carbon dioxide in the presence of the catalyst of claim 1 to obtain a reaction mixture;
stirring the reaction mixture at a temperature of 50 to 90° C. for 6 to 10 h to obtain a product phase and a catalyst phase; and
separating the product phase from the catalyst phase, then drying the product phase to obtain a cyclic carbonate.

9. The method of claim 8, wherein the epoxide has at least one substituent consisting of alkyl group, phenyl group, alkyl halides, alkyl oxides.

10. The method of claim 8, wherein the epoxide has the following formula

wherein R is —$CH_3$, —$CH_2CH_3$, —$CH_2CH_2CH_2CH_3$, —$C_6H_5$, —$CH_2Cl$, —$CH_2OCH_2CH$=$CH_2$, —$CH_2OC_6H_5$.

11. The method of claim 8, further comprising:
reacting the reaction mixture with one or more amines to form a heterocyclic oxazolidinone.

12. The method of claim 8, wherein the catalyst is reused at least 9 times.

13. The method of claim 8, wherein the reaction mixture is solvent free.

14. The method of claim 8, wherein the reacting is carried out at a carbon dioxide pressure of at least 1 bar.

15. The method of claim 8, wherein the yield of cyclic carbonate is at least 51 mole % based on the amount of the epoxide.

16. The method of claim 8, wherein the epoxide is styrene oxide and the reacting forms the cyclic carbonate in a yield of at least 98 mole % based on the amount of the epoxide.

17. The method of claim 8, further comprising:
washing the catalyst phase with an organic solvent, then vacuum drying the catalyst phase at a temperature of 110 to 130° C. to obtain recycled catalyst.

18. The method of claim 17, wherein the organic solvent is an alcohol.

19. The method of claim 17, wherein the recycled catalyst converts at least 95 mole % styrene oxide after at least 9 cycles.

* * * * *